(12) United States Patent
Dillon et al.

(10) Patent No.: US 10,410,145 B2
(45) Date of Patent: Sep. 10, 2019

(54) AUTOMATIC MAINTENANCE ESTIMATION IN A PLANT ENVIRONMENT

(75) Inventors: Steven R. Dillon, White Bear Lake, MN (US); Scott N. Hokeness, Lakeville, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1111 days.

(21) Appl. No.: 11/803,507

(22) Filed: May 15, 2007

(65) Prior Publication Data

US 2008/0288321 A1 Nov. 20, 2008

(51) Int. Cl.
*G06Q 10/06* (2012.01)
*G05B 23/02* (2006.01)

(52) U.S. Cl.
CPC ......... *G06Q 10/06* (2013.01); *G05B 23/0283* (2013.01); *G06Q 10/06311* (2013.01); *G06Q 10/06375* (2013.01)

(58) Field of Classification Search
None
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,885,694 A | 12/1989 | Pray et al. |
| 4,907,167 A | 3/1990 | Skeirik |
| 4,910,691 A | 3/1990 | Skeirik |
| 4,922,412 A | 5/1990 | Lane et al. |
| 4,942,514 A | 7/1990 | Miyagaki et al. |

(Continued)

FOREIGN PATENT DOCUMENTS

| | | |
|---|---|---|
| EP | 0 612 039 A2 | 8/1994 |
| EP | 0 965 897 A1 | 12/1999 |

(Continued)

OTHER PUBLICATIONS

AMS Device Manager with DeltaV, "AMS Suite: Intelligent Device Manager with DeltaV," Product Data Sheet, Nov. 2006, Emerson Process Management (6 pages).

(Continued)

*Primary Examiner* — Stephanie Z Delich
(74) *Attorney, Agent, or Firm* — Marshall, Gerstein & Borun LLP

(57) ABSTRACT

A maintenance system for a process plant collects and uses historical data about maintenance orders. The data identifies the maintenance items for completing an order, such as the labor, materials, and maintenance tasks required. The data is historical data developed from actual completed maintenance orders. The system uses archived historical data and estimates various maintenance information, such as estimated cost for completing the maintenance order, and estimated start and completion times. The estimated data may be based on averaged data as a result. This estimated data along with the other maintenance order information may be sent to a scheduler for identifying a priority to the maintenance order and scheduling it accordingly.

35 Claims, 14 Drawing Sheets

(56) References Cited

U.S. PATENT DOCUMENTS

| | | |
|---|---|---|
| 4,944,035 A | 7/1990 | Roger et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,089,978 A | 2/1992 | Lipner et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Boone |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,329,443 A | 7/1994 | Bonaquist et al. |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,486,920 A | 1/1996 | Killpatrick et al. |
| 5,486,996 A | 1/1996 | Samad et al. |
| 5,488,697 A | 1/1996 | Kaemmerer et al. |
| 5,528,510 A | 6/1996 | Kraft |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,715,178 A | 2/1998 | Scarola et al. |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,777,872 A | 7/1998 | He |
| 5,781,432 A | 7/1998 | Keeler et al. |
| 5,790,898 A | 8/1998 | Kishima et al. |
| 5,796,606 A | 8/1998 | Spring et al. |
| 5,796,609 A | 8/1998 | Tao et al. |
| 5,798,939 A | 8/1998 | Ochoa et al. |
| 5,809,490 A | 9/1998 | Guiver et al. |
| 5,817,928 A | 10/1998 | Garvey, III et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,885 A | 1/1999 | Rusnica et al. |
| 5,859,964 A | 1/1999 | Wang et al. |
| 5,877,954 A | 3/1999 | Klimasauskas et al. |
| 5,880,716 A | 3/1999 | Kunugi et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A | 6/1999 | Cheney et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,033,257 A | 3/2000 | Lake et al. |
| 6,041,263 A | 3/2000 | Boston et al. |
| 6,047,221 A | 4/2000 | Piche et al. |
| 6,055,483 A | 4/2000 | Lu |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Haviena et al. |
| 6,108,616 A | 8/2000 | Borchers et al. |
| 6,110,214 A | 8/2000 | Kiimasaukas |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,246,972 B1 | 6/2001 | Klimasauskas |
| 6,298,454 B1 | 10/2001 | Schleiss et al. |
| 6,317,701 B1 | 11/2001 | Pyotsia et al. |
| 6,397,114 B1 | 5/2002 | Eryurek |
| 6,421,571 B1 | 7/2002 | Spriggs et al. |
| 6,445,963 B1 | 9/2002 | Blevins et al. |
| 6,567,718 B1 | 5/2003 | Campbell et al. |
| 6,625,511 B1 | 9/2003 | Suzuki et al. |
| 6,633,782 B1 | 10/2003 | Schleiss |
| 6,704,689 B1 | 3/2004 | Hogan et al. |
| 6,721,609 B1 | 4/2004 | Wojsznis |
| 6,774,786 B1 | 8/2004 | Havekost |
| 6,795,798 B2 | 9/2004 | Eryurek |
| 6,813,532 B2 | 11/2004 | Eryurek et al. |
| 6,952,680 B1* | 10/2005 | Melby et al. .................. 705/28 |
| 6,965,806 B2 | 11/2005 | Eryurek et al. |
| 8,452,475 B1* | 5/2013 | West ..................... G07C 5/006 |
| | | 701/29.1 |
| 2002/0007298 A1 | 1/2002 | Jim et al. |
| 2002/0123864 A1 | 9/2002 | Eryurek et al. |
| 2002/0161600 A1* | 10/2002 | Stubiger et al. .................. 705/1 |
| 2003/0028269 A1 | 2/2003 | Spriggs et al. |
| 2003/0036939 A1* | 2/2003 | Flores et al. ...................... 705/8 |
| 2003/0195934 A1 | 10/2003 | Peterson et al. |
| 2003/0208390 A1* | 11/2003 | Posner .............................. 705/8 |
| 2003/0225466 A1* | 12/2003 | Yulevitch ............ G06K 9/6284 |
| | | 700/80 |
| 2004/0039619 A1* | 2/2004 | Zarb ................................ 705/7 |
| 2004/0181364 A1* | 9/2004 | Reeves et al. ................ 702/182 |
| 2004/0186927 A1 | 9/2004 | Eryurek et al. |
| 2005/0038721 A1* | 2/2005 | Goeckel ................ G06Q 10/10 |
| | | 705/30 |

(56) References Cited

U.S. PATENT DOCUMENTS

| | | | | |
|---|---|---|---|---|
| 2006/0265098 A1* | 11/2006 | Gould | ............. | G05B 19/40938 700/121 |
| 2007/0050221 A1* | 3/2007 | Singh et al. | ..................... | 705/7 |
| 2008/0062211 A1* | 3/2008 | Kamisuwa et al. | ............. | 347/5 |
| 2008/0262795 A1* | 10/2008 | Webb | ............. | G05B 19/41875 702/184 |

FOREIGN PATENT DOCUMENTS

| | | |
|---|---|---|
| EP | 1286289 | 2/2003 |
| GB | 2 347 234 A | 8/2000 |
| GB | 2353616 | 2/2001 |
| JP | 8-129414 A | 5/1996 |
| JP | 2000-172308 A | 6/2000 |
| JP | 2000-322399 A | 11/2000 |
| JP | 2003-108222 A | 4/2003 |
| JP | 2003-167999 A | 6/2003 |
| JP | 2003-233409 A | 8/2003 |
| WO | WO-0049471 | 8/2000 |
| WO | WO-0233603 | 4/2002 |
| WO | WO-02071173 | 9/2002 |

OTHER PUBLICATIONS

"Components of GE Predictor™ Services," GE Industrial Systems, available at http://www.geindustrial.com/cwc/services?id=74 on Jul. 18, 2002.

CSI's Generic Oil Format, V.2.00, Website, 11 pages, Jul. 14, 1999 http://www.compsys.com/files/GENERIC.pdf.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

Emerson Process Management—CSI—Products; OilView LIMS Instrument Communication, Website, 1 page, © 1996-2001.

Emerson Process Management—CSI—Products: OilView LIMS Module, Website, 2 pages, © 1996-2001.

Emerson Process Management—CSI—Products: OilView Minilab Module, Website, 1 page, © 1996-2001.

Emerson Process Management—CSI—Products: OilView Wear Debris Analysis Module, Website, 2 pages, © 1996-2001.

Garvey, R., "Oilview® Reports for Managing Oil Analysis", Website, 11 pages, Oct. 21, 2002 http://www.compsys.com/enews/knewspro.nsf/v/RGAY-5DHPUX.

Garvey, R., "PPM by Volume and Size Distribution", Website, 6 pages, Sep. 16, 2002 http://www.compsys.com/enews/knewspro.nsf/v/RGAY-5CRJ7W.

Garvey, R., "Reporting with 32-bit OilView Software", Website, 3 pages, Apr. 10, 2000 http://www.compsys.com/enews/knewspro.nsf/v/DBRN-4Z7FZL.

Garvey, R., "Sample Scheduling", Website, 3 pages, Sep. 20, 2002 http://www.compsys.com/enews/knewspro.nsf/v/RGAY-5DHPMB.

Garvey, R., "Set Alarm Limits Using Statistics", Website, 2 pages, Jul. 26, 2000 http://www.compsys.com/enews/knewspro.nsf/v/DBRN-4Z7G2K.

Garvey, R., "Setting Alarm Limits", Website, 4 pages, Aug. 6, 2002 http://www.compsys.com/enews/knewspro.nsf/v/RGAY-5CRJ56.

Garvey, R., "Trivector Graphic", Website, 5 pages, Feb. 3, 2003 http://www.compsys.com/enews/knewspro.nsf/v/RGAY-5JES4Z.

Garvey, R., "Wear Debris Analysis Update", Website, 11 pages, Oct. 7, 2002 http:www.compsys.com/enews/knewspro.nsf/v/RGAY-5DHPUJ.

Garvey, R., "Wear Rates Impact Maintenance Priorities", Website, 9 pages, Nov. 18, 2002 http://www.compsys.com/enews/knewspro.nsf/v/RGAY-5FVRCE.

"GE Predictor™ Services: GE Predictor Services Overview," GE Industrial Systems, available at http://www.geindustrial.com/cwc/services?id=71 on Jul. 18, 2002.

Hayzen, T., "Managing Your Oil Analysis Program", 28 pages, (undated), Website Presentation found at: http://www.compsys.com/files/ManagingOilAnalysisProgram.ppt.

Hayzen, T., "OilView Laboratory Information Management System 'LIMS'", 27 pages, © 2000, Website Presentation found at: http://www.compsys.com/files/LIMS.ppt.

Hayzen, T., "Tribology Storybook", 20 pages, (undated), Website Presentation found at: http://www.compsys.com/files/TribologyStoryBookLetter.ppt.

International Search Report for PCT/US2004/007155, completed Aug. 25, 2004.

International Search Report of PCT/US02/05874, dated Nov. 13, 2002.

LIMS (Lab Information Management System) Technical Description, Product Information for OilView LIMS Module, http://www.compsys.com/marketing/LitCatalog.nsf/lookup/741197FBEBBC252A852569DC006FD245/$FILE/LIMS.doc.

"Mini Lab Report", Website, 5 pages, May 14, 2001 http://www.compsys.com/files/sample_minilab_report.pdf.

Product Data Sheet—PlantWeb Messenger, Website, 4 pages, Jan. 2003 http://www.easydeltav.com/pd/pds%5Fmessenger.pdf.

"Tribology Solutions: Reliability Based Maintenance", 8 pages, © 2002, Website Brochure found at: http://www.compsys.com/files/TribologyBrohiRes.pdf.

Written Opinion for PCT/US2004/007155, dated Sep. 3, 2004.

International Preliminary Report on Patentability and Written Opinion from Application No. PCT/US2008/056841 dated Nov. 26, 2009.

Japanese Patent Application No. 2010-508467 dated Sep. 19, 2012.

Communication pursuant to Article 94(3) EPC dated Nov. 7, 2011 from European Application No. 08 743 845.3.

Decision of Rejection from corresponding Chinese Application No. 200880224674.8 dated Jan. 4, 2013.

Chinese Office Action for CN 200880024674.8 dated Nov. 8, 2011.

Notification of Reexamination for Chinese Application No. 200880024674.8, dated Sep. 11, 2014.

Office Action from Chinese Application No. 201510191079.5 dated Mar. 17, 2017.

* cited by examiner

FIG. 5A

| Maintenance Order | Plans |
|---|---|

Work Order: 1194
Location: BDCUBE — SENSOR MEASUREMENT
Equipment: IT-111 — AMS Business Development Cubicle
Reported By: MAXIMO — Rosemont 3044c in BD Cube
Status: WSCH
GL Account:

WO Priority: 5
Loc/Eq Priority:
Equipment Up?: Y
Work Phone:
Charge to Store?: N
Warranty Date:
Work Type: EM

Job Details
Job Plan:
Safety Plan:
PM: AMS10130
Service Contract:

Problem
Failure Class:
Problem Code:

Reported By: 8/18/06
Status Date: 8/18/06

Follow-up Work
Originating WO:
Has Follow-up Work?:

Scheduling Information — 374

Target Start: 8/21/06 11:42AM — 376
Completion: 8/29/06 11:42AM — 378
Problem Code:
Actual:
Crew:
Estimated Duration: 192
Interruptible?:
Remaining Duration:

Responsibility
Supervisor:
Labor Group:
Lead Craft/Person:
Modified
By: Maximo
Date: 8/18/06

Maintenance Order | Plans

Work Order: 1003    Check for Plumbing Problem    Status: APPR    Parent WO: APPR There are currently no child Maintenance Orders Tasks for Work Order 1003

Filter | Displaying 1-4 of 4

| Sequence | Task ID | Description | Duration | Status |
|---|---|---|---|---|
| | 10 | REMOVE WALL PLATE IN PLASTICS SHOP | 0.00 | APPR |
| | 20 | INSPECT PLUMBING FOR LEAK | 0.00 | APPR |
| | 30 | REPAIR AS NECESSARY | | APPR |
| | 40 | REPLACE WALL PLATE AND CLEANUP | 0.00 | APPR |

New Row

Plan for Work Order 1003 and its Tasks

Labor | Materials | Tools

Filter | Displaying 1-1 of 1

| Task ID | Labor Code | | Quantity | Hours | Rate | Line Cost |
|---|---|---|---|---|---|---|
| | ME1 | Mechanic 1st class | 2 | 5:00 | 18:50 | 185.00 |

Select Labor | New Row

AUTOMATIC MAINTENANCE ESTIMATION IN A PLANT ENVIRONMENT

FIELD OF THE DISCLOSURE

The present invention relates generally to process control systems within process plants and, more particularly, to the use of a coordinated expert system to aid asset utilization and optimization in a process plant.

BACKGROUND OF RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process. In the past however, process controllers were not necessarily aware of these other devices or the process controllers simply assumed that these devices were operating properly when performing process control.

Still further, many process plants have other computers associated therewith that execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS™) Intelligent Device Manager or AMS™ Suite of applications sold by Fisher-Rosemount Systems, Inc. enables communication with and stores data pertaining to field devices to ascertain and track the operating state of the field devices. A previous example of such a system is disclosed in U.S. Pat. No. 5,960,214 entitled "Integrated Communication Network for use in a Field Device Management System." In some instances, an AMS™ application may be used to communicate with devices to change parameters within the device, to cause the device to run applications on itself, such as self-calibration routines or self-diagnostic routines, to obtain information about the status or health of the device, etc. This information may be stored and used by a maintenance person to monitor and maintain these devices. Likewise, there are other types of applications that are used to monitor other types of devices, such as rotating equipment and power generation and supply devices. These other applications are typically available to the maintenance persons and are used to monitor and maintain the devices within a process plant.

However, in the typical plant or process, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers that provide information to the operators about the operation of the process, including alarms generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. Such an expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit.

On the other hand, maintenance personnel who are primarily responsible for assuring that the actual equipment within the process is operating efficiently and for repairing and replacing malfunctioning equipment, use tools such as maintenance interfaces, the AMS™ applications discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools that automatically sense problems with the operation of the device and automatically report these problems to a maintenance person via a standard maintenance interface. For example, the AMS™ software reports device status and diagnostic information to the maintenance person and provides communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Because, for the most part, different applications are used to perform different functions in a plant (e.g., separate process control, maintenance and business operations), these applications are not integrated and do not sufficiently share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is a lot of information about the health and performance of devices available to the maintenance person which could be helpful to the process operator and the business persons. Similarly, there is a lot of information available to the process operator about the current operational status of the process control loops and other routines which may be helpful to the maintenance person or to the business person. Likewise, there is information generated by or used in the course of performing the business functions which could be helpful to the maintenance person or the process control operator in optimizing the operation of the process. However, in the past, because these functions were separated, the information generated or collected in one functional area was not used at all, or not used very well in other functional areas which led to an overall sub-optimal use of the assets within process plants. The separate treatment of these functions (maintenance, process, and business) means that, unless cumbersome efforts are undertaken, personnel operating under one of these functions may not be fully informed of information from other function area, information that would be helpful in task execution. This may result in sub-optimum use of assets in particular with respect to scheduling the maintenance of assets in the processing plant. Keeping track of and scheduling maintenance orders may be particularly difficult due to the limitations of shared data regarding process plant performance. Furthermore, the oftentimes long lead times between the identification of a maintenance need and the start of the corresponding maintenance order add an additional layer of complexity to maintenance teams trying to schedule orders. Plant maintenance teams, for example, may plan a shutdown, retooling, reconfiguration of process based on the health of a loop. But there are no systems in place to effectively estimate when maintenance will be needed and when those orders should be scheduled among the other maintenance needs.

SUMMARY

A process control system uses data or information pertaining to the assets of a process plant from various devices within the process plant. The devices may include field devices such as valves, positioners, switches, multiplexers, transmitters, sensors, control systems, transceivers, variable speed drivers, actuators, I/O systems, two-, three-, or four-wire devices, etc., as well as various smart devices including devices according to a specific protocol such as Fieldbus, HART, PROFIBUS®, WORLDFIP®, Device-Net®, AS-Interface, and CAN. The devices may also include network communication devices such as TCP/IP protocol devices, Ethernet devices, and Internet devices. The entities may further include field equipment such as power generation equipment, power distribution equipment, transformers, tanks, rotating equipment, measuring equipment, pumps, etc. The data and information of the process plant, such as control, process and maintenance data, is manipulated in a coordinated manner by tools, such as to create status information regarding the device. The status information may be utilized to perform better or more optimal maintenance activities, such as corrective measures pertaining to a problem with the device. For example, information or data may be collected by maintenance functions pertaining to the status of a device. This information may then be used to determine the status of the device. The status information may be in the form of diagnostic information, maintenance requests, notifications of current or future problems, etc. If the status information indicates a problem with the device, a maintenance order and/or parts order related to solving the problem may be automatically generated. The order may then be communicated to fulfill the order. In the case of a parts order, the communication may be with a supplier of the parts to be used in the repair. If the order is a maintenance order, the appropriate maintenance personnel may be alerted. In other cases, such as with predicted future problems, the order may be scheduled such that it will be fulfilled prior to the predicted failure of the device. In addition, the status of the order may be tracked based on periodic reports regarding the order.

The process control system may collect status information from plant assets periodically, continuously, or otherwise to identify and to schedule maintenance orders. The system may schedule maintenance orders based a variety of factors, including estimated maintenance information regarding estimated cost, estimated time and estimated materials required. The present application describes control systems that are able to estimate various kinds of information to improve the prioritization and scheduling of maintenance orders. In some examples, the control system is an asset management system that automatically communicates some asset request data to an enterprise asset management (EAM) system to query that system for current and/or historical data on various maintenance items associated with the asset request data. Such data may include maintenance tasks, labor, and materials information for the asset request data. For example, upon an alarm condition, the asset management system may identify the problematic asset to the EAM, which then provides maintenance related information related to maintenance tasks, materials, and labor to the asset management system. The asset management system analyzes this data and develops estimated maintenance information for completing a maintenance order to address the alarm condition. The asset management system may estimate the costs associated with the maintenance order, the average start time for commencing the maintenance order, the projected completion time of the maintenance order, and the materials, labor and tasks required. In an example, the asset management system creates a maintenance order based on the estimated maintenance information and communicates that maintenance order to a maintenance order scheduler within the asset management system, the EAM, or elsewhere, for appropriate scheduling of maintenance orders. In some examples, the maintenance order may be created within the EAM itself.

Once the system has developed the maintenance order with the estimated maintenance information, a scheduler may automatically generate a maintenance schedule based, at least in part, upon the estimated maintenance information developed by the asset management system. In some examples, the scheduler may not only consider the estimated maintenance information from the asset management system but also consider current asset data such as status information of a health index, variability index, utilization index, and performance index. This information may be process specific, device specific, unit specific, loop specific or a combination thereof.

In any event, the scheduler may schedule the maintenance order based off of current status information, actual data on maintenance items (e.g., lists of available materials), and historical data on past, completed maintenance items (e.g., past maintenance tasks need to complete similar maintenance orders). The maintenance schedule may be coordinated with a maintenance system, a process control system, and business applications, as desired, to affect scheduling, parts ordering, personnel assignment, and the completion of other maintenance items.

The system may also re-determine the maintenance schedule as events change, for example when there is a change in the estimated maintenance information for a particular maintenance order, as may occur when there is a change to the availability of materials or labor. Correspondingly, the asset management system may communicate the changed maintenance information, estimated or otherwise, to the maintenance scheduler for revising the maintenance schedule as needed.

BRIEF DESCRIPTION OF THE DRAWINGS

FIGS. 5A and 5B are example depictions of panels of displays that may be provided by a graphical user interface to enable a user to view maintenance orders having automatically populated data;

DETAILED DESCRIPTION OF AN EXAMPLE

Figure 1:
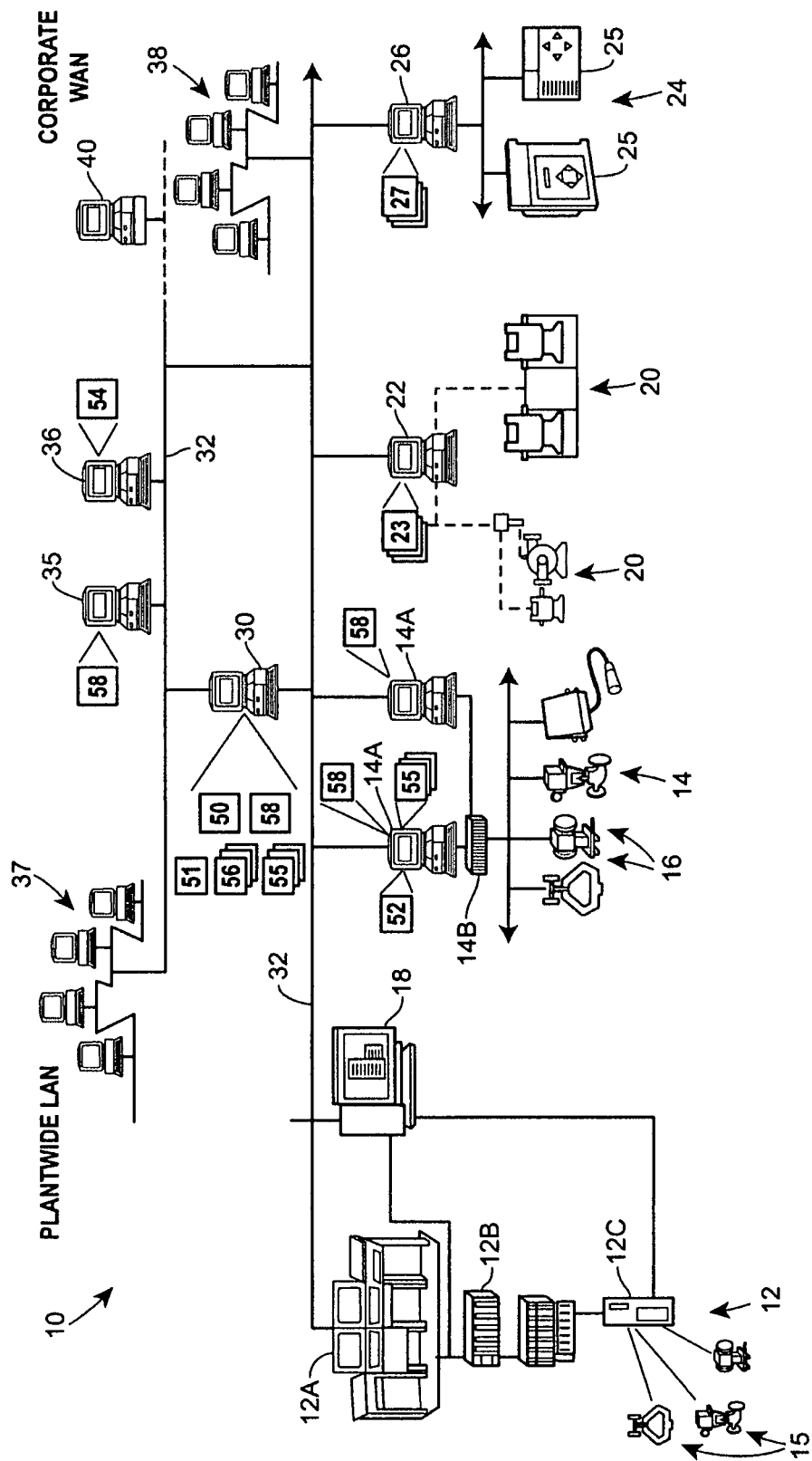
FIG. 1 is a block diagram of a process plant having an asset management system configured to receive and coordinate data transfer between many functional areas of the plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing an AMS™ application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as an AMS™ application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSi Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

In the past, the various process control systems 12 and 14 and the power generating and maintenance systems 26 and 22, respectively, have not been interconnected with each other in a manner that enables them to share data generated in or collected by each of these systems in a useful manner. As a result, each of the different functions such as the process control functions, power generation functions and rotating equipment functions have operated on the assumption that the other equipment within the plant which may be affected by or have an affect on that particular function is operating perfectly which, of course, is almost never the case. However, because the functions are so different and the equipment and personnel used to oversee these functions are different, there has been little or no meaningful data sharing between the different functional systems within the plant 10.

To overcome this problem, a computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML protocol. Here, data from each of the computers 12A, 18, 14A, 22, 26, 35, 36, etc. is wrapped in an XML wrapper and is sent to an XML data server which may be located in, for example, the computer 30. Because XML is a descriptive language, the server can process any type of data. At the server, if necessary, the data is encapsulated with to a new XML wrapper, i.e., this data is mapped from one XML schema to one or more other XML schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset management system 50 that collects data and other information generated by the process control systems 12 and 14, the maintenance systems 18, 22 and 26 and the business systems 35 and 36 as well as information generated by data analysis tools executed in each of these systems. The asset management system 50 may be based on, for example, the OZ expert system currently provided by NEXUS. However, the asset management system 50 may be any other desired type of expert system including, for example, any type of data mining system. Importantly, the asset management system 50 operates as a data and information clearinghouse in the process plant 10 and is able to coordinate the distribution of data or information from one functional area, such as the maintenance area, to other functional areas, such as the process control or the business functional areas. The asset management system 50 may also use the collected data to generate new information or data which can be distributed to one or more of the computer systems associated with the different functions within the plant 10. Still further, the asset management system 50 may execute or oversee the execution of other applications that use the collected data to generate new types of data to be used within the process plant 10.

In particular, the asset management system 50 may include or execute index generation software 51 that creates indices associated with devices, like process control and instrumentation devices, power generation devices, rotating equipment, units, areas, etc., or that are associated with process control entities, like loops, etc. within the plant 10. These indices can then be provided to the process control applications to help optimize process control and can be provided to the business software or business applications to provide the business persons more complete or understandable information associated with the operation of the plant 10. The asset management system 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired.

In one embodiment, the control expert 52 may be, for example, the control expert described in U.S. patent application Ser. Nos. 09/256,585 and 09/499,445 identified above. However, these control experts may additionally incorporate and use data related to the status of devices or other hardware within the process plant 10 in the decision making performed by these control experts. In particular, in the past, the software control experts generally only used process variable data and some limited device status data to make decisions or recommendations to the process operator. With the communication provided by the asset management system 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset management system 50 can provide information pertaining to states of devices and the operation of the control activities within the plant 10 to the business systems 35 and 36 where, for example, a maintenance order generation application or program 54 can automatically generate maintenance orders and order parts based on detected problems within the plant 10 or where supplies can be ordered based on work being performed. Similarly, changes in the control system detected by the asset management system 50 may cause the business systems 35 or 36 to run applications that perform scheduling and supply orders using, for example, the program 54. In the same manner, changes in customer orders etc. can be entered into the business systems 35 or 36 and this data can be sent to the asset management system 50 and sent to the control routines or control expert 52 to cause changes in the control to, for example, begin making the newly ordered products or to implement the changes made in the business systems 35 and 36. Of course, if desired, each computer system connected to the bus 32 may have an application therein that functions to obtain the appropriate data from the other applications within the computer and to sending this data to, for example, the asset management system 50.

Additionally, the asset management system 50 can send information to one or more optimizers 55 within the plant 10. For example, a control optimizer 55 can be located in the computer 14A and can run one or more control optimization routines 55A, 55B, etc. Additionally or alternatively, optimizer routines 55 could be stored in and executed by the computer 30 or any other computer, and the data necessary therefore could be sent by the asset management system 50. If desired, the plant 10 may also include models 56 that model certain aspects of the plant 10 and these models 56 can be executed by the asset management system 50 or a control or other expert such as the control expert 52 to perform modeling functions, the purpose of which will be described in more detail herein. Generally speaking, however, the models 56 can be used to determine device, area, unit, loop, etc. parameters, to detect faulty sensors or other faulty equipment, as part of optimizer routines 55, to generate indices such as performance and utilization indices for use in the plant 10, to perform performance or condition monitoring, as well as for many other uses. The models 56 may be models such as those created by and sold by MDC Technology located in Teeside, England or may be any other desired types of models. There are, of course, many other applications that can be provided within the plant 10 and that can use the data from the asset management system 50 and the system described herein is not limited to the applications specifically mentioned herein. Overall, however, the asset management system 50 helps to optimize the use of all of the assets within the plant 10 by enabling the sharing of data and coordination of assets between all of the functional areas of the plant 10.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset management system 50 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indices created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as an AMS™ application or any other maintenance programs, or as generated by the models in conjunction with the asset management system 50. Of course, the user interface routine 58 may provide any user access to and enable the user to change preferences or other variables used in any or all functional areas of the plant 10.

Figure 2:
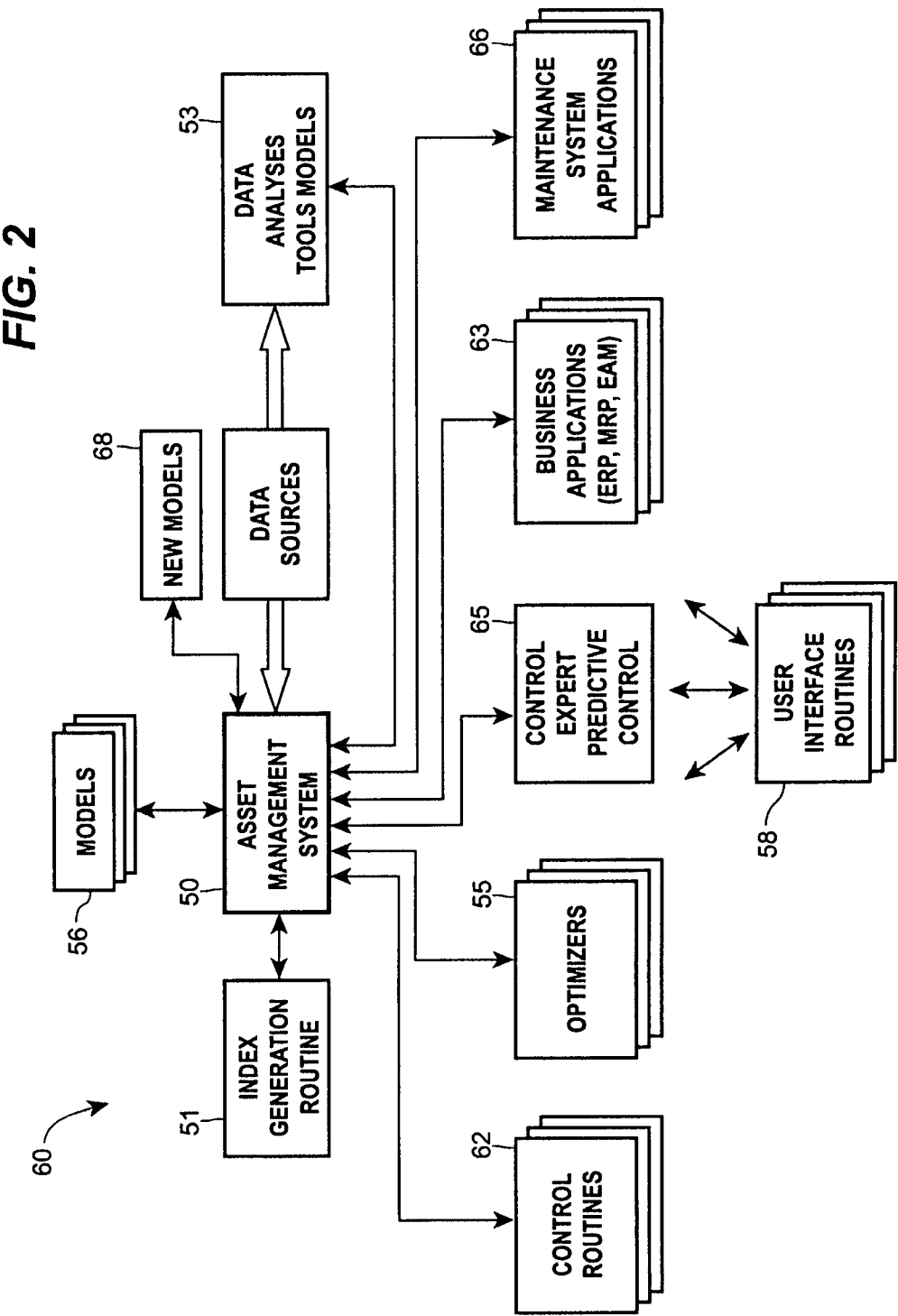
FIG. 2 is a data and information flow diagram with respect to the asset management system within the plant of FIG. 1.

To provide a discussion on the collection and analysis of asset data in the process plant 10, reference is made to FIG. 2, which illustrates a data flow diagram illustrating some of the data flow between the asset management system 50 and other computer tools or applications within the process plant 10 is provided. While the utilization system 50 is described below in relations to some capabilities, a further, more-detailed discussion of an example asset management system is discussed with respect to the asset utilization expert in U.S. application Ser. No. 10/086,159, entitled "Automatic work order/parts order generation and tracking", filed on Feb. 28, 2002, the entirety of which is hereby expressly incorporated herein by reference.

The asset management system 50 may receive information from numerous data collectors or data sources such as multiplexers, transmitters, sensors, hand held devices, control systems, radio frequency (RF) transceivers, on-line control systems, web servers, historians, control modules or other control applications within the process plant 10, interfaces such as user interfaces and I/O interfaces as well as data servers such as buses (e.g., Fieldbus, HART and Ethernet buses), valves, transceivers, sensors, servers and controllers and other plant assets such as process instrumentation, rotating equipment, electrical equipment, power generation equipment, variable speed drivers, etc. This data can take on any desired form based on how the data is generated or used by other functional systems. Still further, this data may be sent to the asset management system 50 using any desired or appropriate data communication protocol and communication hardware such as the XML protocol discussed above. Generally speaking, however, the plant 10 will be configured so that the asset management system 50 automatically receives specific kinds of data from one or more of the data sources and so that the asset management system 50 can take predetermined actions with respect to that data.

Also, the asset management system 50 receives information from (and may actually execute) data analysis tools such as typical maintenance data analysis tools which are currently provided today, performance tracking tools, such as those associated with devices, as well as performance tracking tools for process control systems like that described in U.S. patent application Ser. Nos. 09/256,585 and 09/499,445 identified above. The data analysis tools may also include, for example, a root cause application which detects root causes of certain types of problems, event detection such as that described in U.S. Pat. No. 6,017,143, regulatory loop diagnostics such as that disclosed in U.S. patent application Ser. No. 09/303,869 (filed May 3, 1999), which is hereby expressly incorporated by reference herein, impulse lines plugging detection applications, such as that described in U.S. patent application Ser. No. 09/257,896 (filed Feb. 25, 1999), which is hereby expressly incorporated by reference herein, other plugged line detection applications, device status applications, device configuration applications and maintenance applications, device storage, historian and information display tools, such as AMS™, Explorer applications and audit trail applications. Still further, the system 50 can receive data and any information from process control data analysis tools such as the advanced control expert 52, model predictive control process routines such as those described in U.S. patent application Ser. No. 09/593,327 (filed Jun. 14, 2000) and Ser. No. 09/412,078 (filed Oct. 4, 1999), which are hereby expressly incorporated by reference herein, tuning routines, fuzzy logic control routines and neural network control routines, as well as from virtual sensors such as that described in U.S. Pat. No. 5,680,409, which may be provided within the process control system 10. Still further, the asset management system 50 may receive information from data analysis tools related to rotating equipment such as on-line vibration, RF wireless sensors and hand-held data collection units, oil analysis associated with rotating equipment, thermography, ultrasonic systems and laser alignment and balancing systems, all of which may be related to detecting problems or the status of rotating equipment within the process plant 10. These tools are currently known in the art and so will not be described further herein. Still further, the asset management system 50 may receive data related to power management and power equipment and supplies such as the applications 23 and 27 of FIG. 1, which may include any desired power management and power equipment monitoring and analysis tools.

In one embodiment, the asset management system 50 executes or oversees the execution of mathematical software models 56 of some or all of the equipment within the plant 10, such as device models, loops models, unit models, area models, etc., which are run by, for example, the computer 30 or any other desired computer within process plant 10. The asset management system 50 may use the data developed by or associated with these models for a number of reasons. Some of this data (or the models themselves) may be used to provide virtual sensors within the plant 10. Some of this data, or the models themselves, may be used to implement predictive control or real time optimal control within the plant 10. Some of the data generated by the models 56 may be used by the index generation routine 51 to generate indices which are used in other applications, such as business and process control applications. The use of the models 56 for these and other purposes will be described in more detail below.

The asset management system 50 receives data as it is generated or at certain periodic times over, for example, the bus 32 or other any communication network within the process plant 10. Thereafter, periodically or as needed, the asset management system 50 redistributes the data to other applications or uses that data to generate and provide other information useful in different aspects of the control or operation of the process plant 10 to other function systems within the plant 10. In particular, the asset management system 50 may supply data to cause the index generation routine 51 to create a series of composite indices such as a performance index, a utilization index, a health index and a variability index associated with one or more of the devices, units, loops, areas, or other entities within the process plant 10. The generation and use of these indices will also be discussed in more detail herein.

The asset management system 50 may develop models from information received from a data analysis tool models system 53, which may contain previously developed models or model segments that may be assembled into a model at the asset management system 50. In some examples, the tool models system 53 includes design parameter models that the system 50 compares against actual performance model data to determine a performance index.

The asset management system 50 may also provide data to and receive data from control routines 62 which may be located in process controllers or interfaces associated with those controllers, optimizers 55, business applications 63, maintenance applications 66, etc.

Furthermore, a control expert 65 (which may include a predictive process controller), which in the past simply assumed that the devices it was controlling either worked properly or not at all, can receive information from the asset management system 50 related to the status or health of the devices it is controlling, such as the utilization, variability, health or performance indices mentioned above or other information related to the operating status of devices, loops, etc. which can be taken into account when trying to control a process. The predictive controller 65, as well as the optimizers 55 may provide additional information and data to user interface routines 58. The predictive controller 65 or optimizer 55 may use the status information pertaining to actual current status of the devices in the network, as well as take into account goals and future needs such as those identified by business solution software provided from the asset management system 50 as defined by, for example, business applications 63, to optimize control based on predictions within the control system.

Still further, the asset management system 50 may provide data to and receive data from enterprise resource planning tools such as those typically used in business solutions or business computers 35 and 36. These applications may include production planning tools which control production planning, material resource planning, the maintenance order generation tool 54 which automatically generates part orders, maintenance orders, or supply orders for use in the business applications, etc. Of course, the part order, maintenance order and supply order generation may be completed automatically based on information from the asset management system 50, which decreases the time required to recognize that an asset needs to be fixed as well as the time is takes to receive the parts necessary to provide corrective action with respect to maintenance issues.

The asset management system 50 may also provide information to the maintenance system applications 66, which not only alert maintenance people to problems immediately, but also take corrective measures such as ordering parts, etc. which will be needed to correct a problem. Still further, new models 68 may be generated using types of information that are available to the asset management system 50 but that were previously unavailable to any single system. Of course, it will be understood from FIG. 2 that the asset management system 50 not only receives information or data from the data models and the analysis tools but, also receives information from enterprise resource tools, maintenance tools and process control tools.

Moreover, one or more coordinated user interface routines 58 may communicate with the asset management system 50 as well as any other applications within the plant 10 to provide help and visualization to operators, maintenance persons, business persons, etc. The operators and other users may use the coordinated user interface routines 58 to perform or to implement predictive control, change settings of the plant 10, view help within the plant 10, or perform any other activities related to the information provided by the asset management system 50.

The asset management system 50 can execute or oversee the execution of one or more mathematical or software models 56 that model the operation of a particular plant or entities within the plant, such as devices, units, loops, areas, etc. Through these models, the asset management system 50 may also define a performance index or plot by comparing one or more of the parameters determined by the models as described above with the same parameter determined by the model run in accordance with the design parameters of the entity being modeled. Other models may be used to indicate the health of certain devices or other entities and to provide a health index indicative of these entities. For example, the error measurements of certain input and output sensors as determined by the regression analysis used on certain models may be used as or converted into an indication of the health of those devices.

In addition to performance and health indices, the asset management system 50 can assist the index generation routine 51 in creating other types of indices such as a utilization index and a variability index. A variability index indicates how much some signal into or out of, or some other parameter associated with a device, loop, unit, etc. varies as compared to how much this signal or parameter is expected to vary. The utilization index, in one form or another, tracks or reflects the utilization of individual devices, units, loops, or other entities and may provide some indication as to whether these entities are being over utilized or under utilized based on previously determined bench marks or operational goals.

One important aspect of the system of FIG. 1 is the user interface routines 58 which provide a graphical user interface (GUI) that is integrated with the asset management system 50 described herein to facilitate a user's interaction with the various asset utilization capabilities provided by the asset management system 50. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the asset management system 50 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the asset management system 50.

Generally speaking, the GUI described herein provides intuitive graphical depictions or displays of process control areas, units, loops, devices, etc. Each of these graphical displays may include numerical status and performance indices (some or all of which may be generated by the index generator routine 51 described above) that are associated with a particular view being displayed by the GUI. For example, a display depicting a process control area may provide a set of indices reflecting the status and performance of that area (i.e., a particular portion of the process control system at a particular level of the equipment hierarchy). On the other hand, a display depicting a loop may provide a set of status and performance indices associated with that particular loop. In any event, a user may use the indices shown within any view, page or display to quickly assess whether a problem exists within any of the devices, loops, etc. depicted within that display.

Additionally, the GUI described herein may automatically, or may in response to a request by a user, provide maintenance information to the user. Any portion of the asset management system 50 may provide the maintenance information. Similarly, the GUI may display alarm information, process control information, etc., which may also be provided by the asset management system 50. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Figure 3:
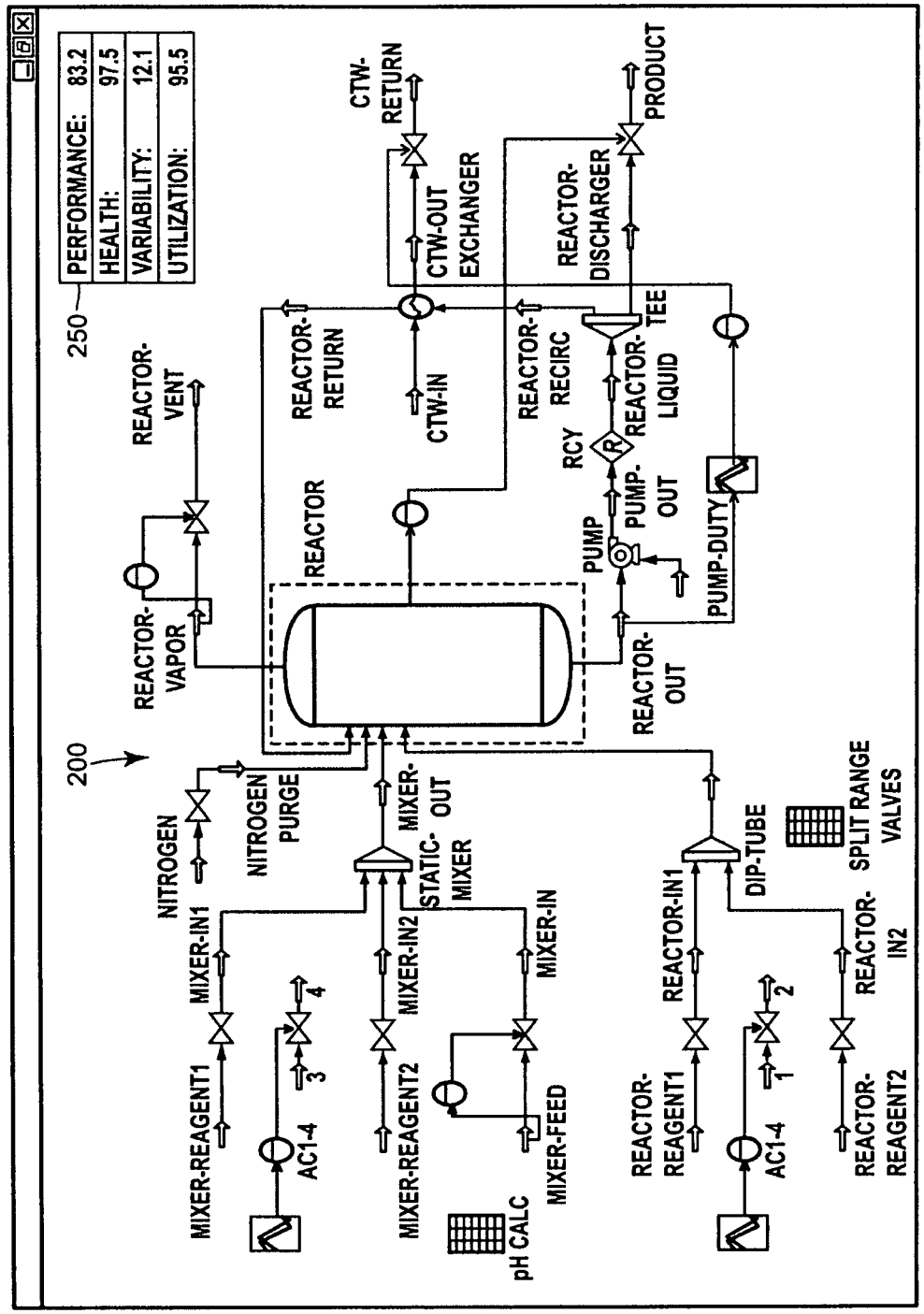
FIG. 3 is an exemplary depiction of a display representing a unit within a process control system that may be displayed by a graphical user interface.

FIG. 3 is an exemplary depiction of a display representing a unit 200 within a process control system that may be displayed by the GUI. As illustrated in FIG. 3, the unit 200 includes a plurality of devices such as, for example, valves, pumps, temperature transmitters, etc., all of which may be depicted graphically as shown. Additionally, the display may further include lines arrows, and any other indicia to represent logical and physical interconnections between the various devices. Of course, such graphical representations of process control systems (or portions of process control systems) are well known in the art and, thus, the manner of implementing these graphical representations or displays will not be described in further detail herein.

Importantly, the GUI display shown in FIG. 3 also includes a plurality of index names and values 250. In particular, the index names and values 250 include a performance index, a health index, a variability index and a utilization index, all of which have been discussed briefly above in connection with the asset management system 50 and the index generation routine 51. The index names and values 250 may be displayed in a tabular format as shown or in any other desired format. The index names and values 250 are representative of the performance and status of the entire unit 200 and, thus, the index values shown are preferably, but not necessarily, composed of the index values associated with each of the sub-units and/or devices that make up the unit 200.

Figure 4:
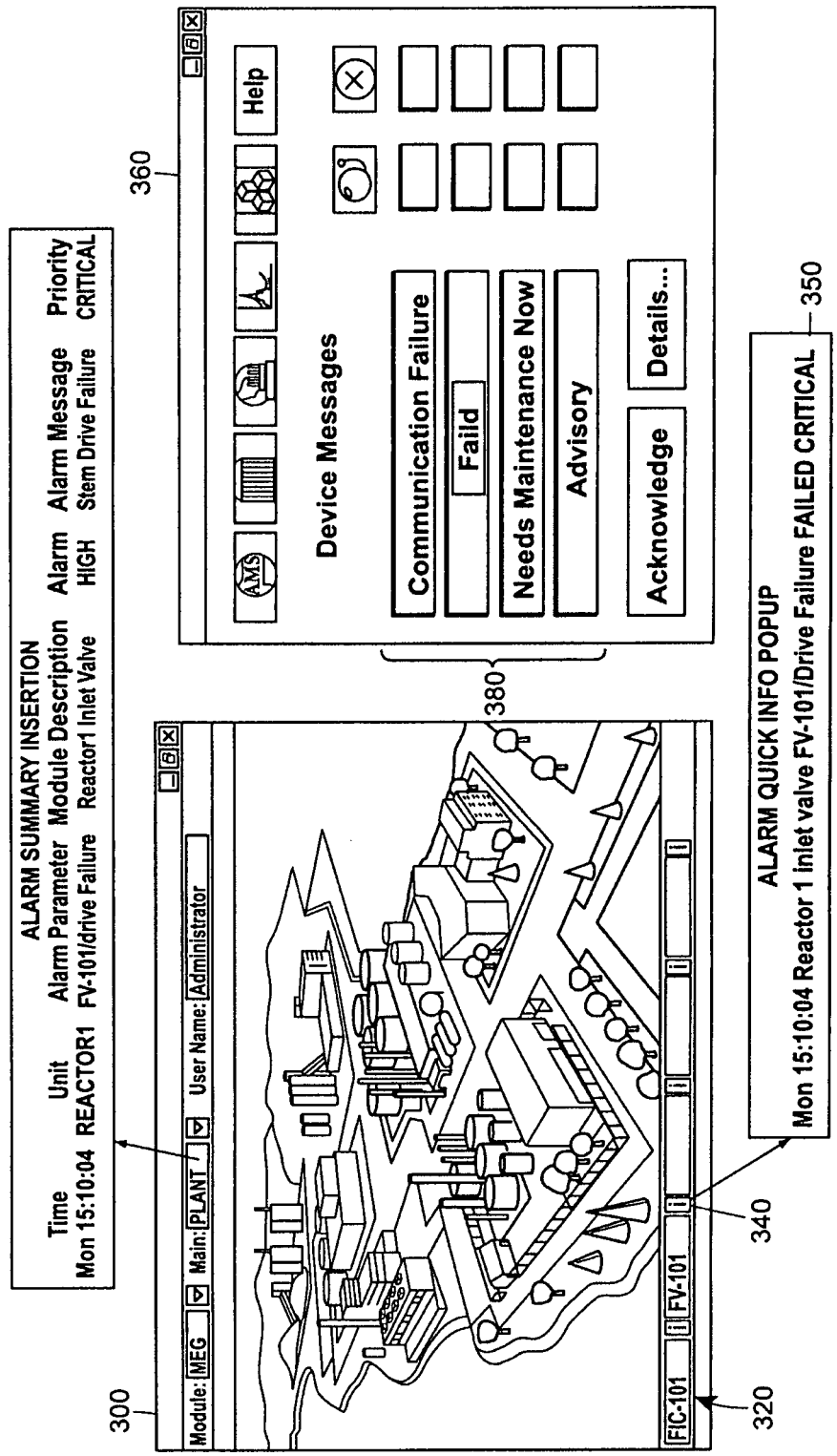
FIG. 4 is yet another exemplary depiction of a display that may be provided by a graphical user interface to enable a user to quickly investigate information within a plant.

FIG. 4 is another exemplary depiction of a display that may be provided by the GUI to enable a user to quickly investigate alarm information, conditions, etc. within the plant 10. A high level graphical view 300 of the plant 10 may include an alarm banner 320 having one or more pending alarms. Each of the alarms within the alarm banner may be represented using an alphanumeric indicator that is uniquely associated with the device which generated the alarm or event. Additionally, each of the alarms within the banner 320 may also include an information button 340, which may be selected by a user to generate a pop-up window 350 containing more detailed information relating to that particular alarm. Further, the user may also select the alphanumeric designator for the device causing a particular alarm to investigate the possible reasons for the alarm. When the alphanumeric designator is selected, the GUI may provide a pop-up window 360. The pop-up window 360 may provide one or more response categories 380, which may facilitate the user's understanding of how a particular alarm should be addressed and within what time frame the alarm should be addressed. By way of example, the pop-up window 360 may indicate that a particular device is no longer communicating, that the device has failed, that the device needs maintenance immediately, or that the device requires maintenance or some other attention soon. Of course more, fewer and/or different response categories may be used instead. The alarm display generated by the GUI at this point may be the integrated display disclosed in U.S. patent application Ser. No. 09/707,580 (filed Nov. 7, 2000) which is hereby expressly incorporated by reference herein. Generally, this alarm display may show process alarms and alerts as well as other types of alarms like maintenance alarms and alerts. Furthermore, information about the alarm, such as specific information provided in the field 350 of the alarm banner may be sent to the GUI or to the asset management system 50 along with the alarm.

FIGS. 5A and 5B are example depictions of displays that may be provided by the GUI and which enable a user to track maintenance orders that may have been automatically generated by the maintenance order generation routine 54. The asset management system 50 may provide data to the maintenance order generator routine 54 which causes that routine to automatically generate maintenance orders in response to a problem or potential problem discovered or recognized by the asset management system 50 and/or a user working with the asset management system 50 via the GUI. For example, the asset management system 50 may receive diagnostic information, maintenance requests, etc. and, in response may cause the maintenance system to generate a maintenance order that requests a maintenance person to attend to one or more problems in connection with the diagnostic information. Of course, the specifics of the maintenance order generated will depend on the type of problem or situation detected and the standard forms used to correct the problem, such as ordering parts, supplies, etc.

FIG. 5A illustrates a display panel 370 that may be presented to a user in a dialog box 372 and which shows various information regarding a maintenance order, order "1194" in the illustrated example. The illustrated display panel 370 presents various information such as location, equipment type, and reporting source ("Maximo"). This information is for example purposes, as a user may be provided with any information regarding a plant asset and maintenance order. Furthermore, this general information may be automatically populated from previously stored data. In addition to this general information, the display panel 370 illustrates a scheduling information section 374 in which automatically generated estimated time data is displayed to the user. That estimated time data includes both an estimated start (lead) time 376 and an estimated completion time 378 developed by the asset management system 50 based on available labor, materials and average time or historical time for maintenance data, in accordance with techniques as described herein. The display panel 370 also has dialog boxes 380 and 382 for entering actual start and completion times, respectively, which can be used later as historical time information data regarding this type of maintenance order.

Whereas FIG. 5A illustrates a general maintenance order display showing estimated time calculations, FIG. 5B illustrates a display panel 384 showing estimated tasks 386 for a maintenance order (labeled work order "1003") and estimated cost data 388 automatically generated by the asset management system 50, in accordance with techniques described herein, for completing those tasks. In the illustrated example, the estimated cost data 388 depicts automatically determined cost data for labor required to complete the maintenance order. By selecting tabs 390 and 392, a user is able to view estimated cost information for materials and tools, respectively.

While FIGS. 5A and 5B depict various information regarding maintenance orders and do so in different panels, it will be understood that these are provided by way of example only. The user interface routines 58 may present maintenance order information including the automatically generated estimated data to a user in any variety of ways, including on a single display or across multiple display panels. In addition, additional, different, or less information may be provided to the user, than what is depicted in the examples of FIGS. 5A and 5B.

As used herein, the term "maintenance order" would include what is also termed a "work order," such as in the example of U.S. application Ser. No. 10/086,159, referenced above. Furthermore, "maintenance order" as used herein may also include maintenance requests and work requests. For example, in some systems, the system may only submit a "work request" and a subsequent action must be taken to "approve/assign" the request, which then makes the request a work order. In any event, the term "maintenance order" as used herein may include any such order or request.

Still further, the maintenance order generation routine 54 could include a business to business communication function that, based on detected actual or predicted problems within the plant 10, will automatically communicate with a supplier or other business to order parts, supplies, etc. with or without operator or maintenance person intervention. More particularly, the routine 54 can receive notifications of current problems or predicted future problems with devices or other assets based on data provided by or predictions made by the asset management system 50 or any of the data analysis tools, such as the rotating equipment analysis tools. The routine 54 then automatically contacts a supplier via, for example an Internet, telephone, wireless or other communication connection and orders the parts, equipment or supplies to be delivered to the plant 10 before the device needs to be replaced. In this manner, the maintenance order generation routine 54 limits the down time or helps to assure that there is little or no down time caused by the need to wait for parts, equipment or supplies to fix the problem when it actually occurs. This fact then makes the plant 10 more efficient.

Figure 6:
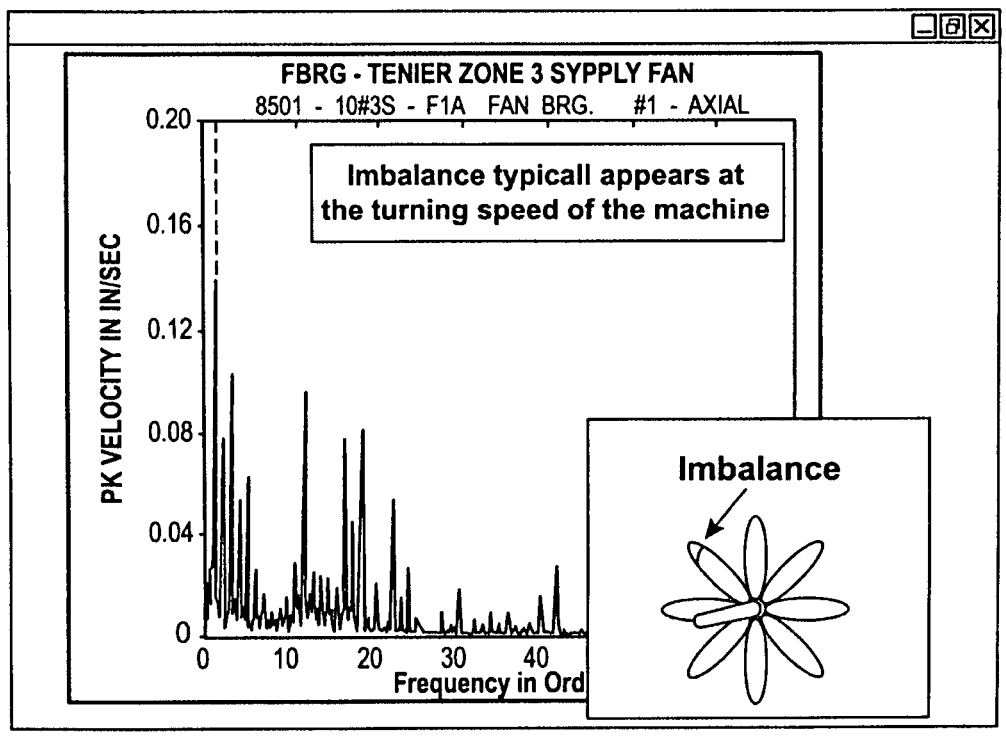
FIGS. 6-9 illustrate displays showing spectral plots of vibration of an element within a rotary device.
Figure 7:
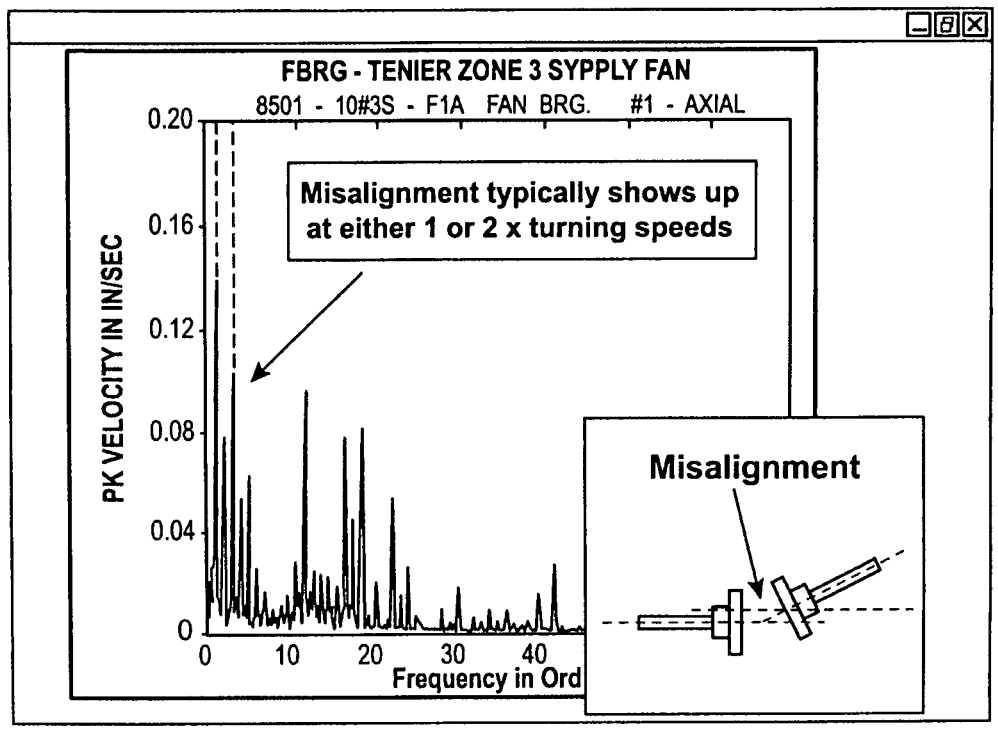
Figure 8:
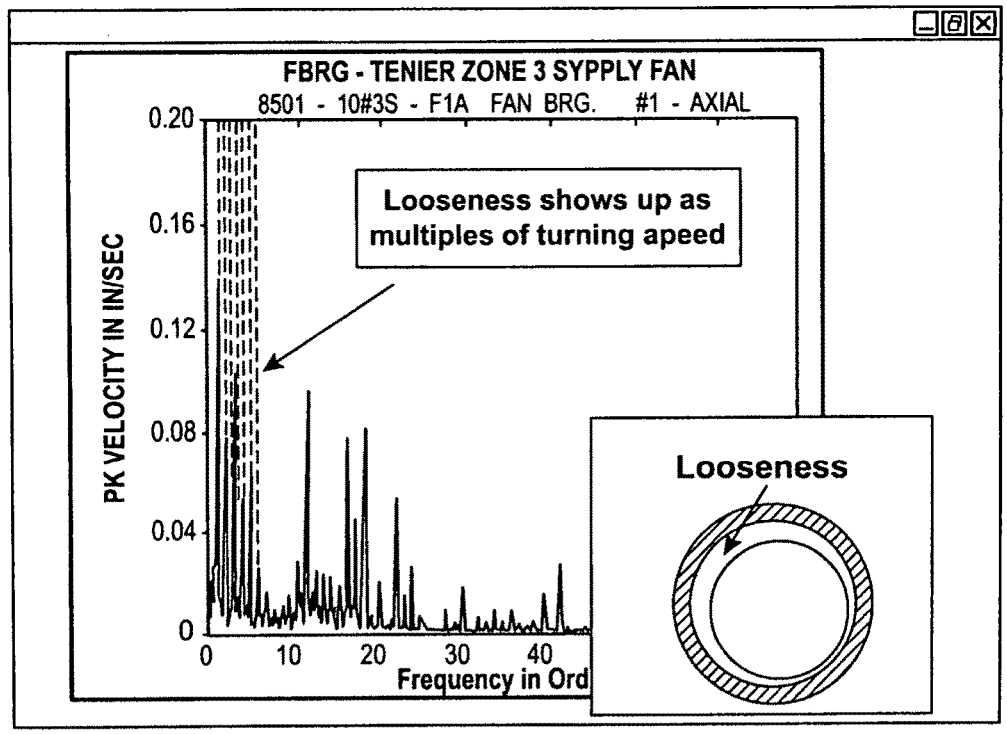
Figure 9:
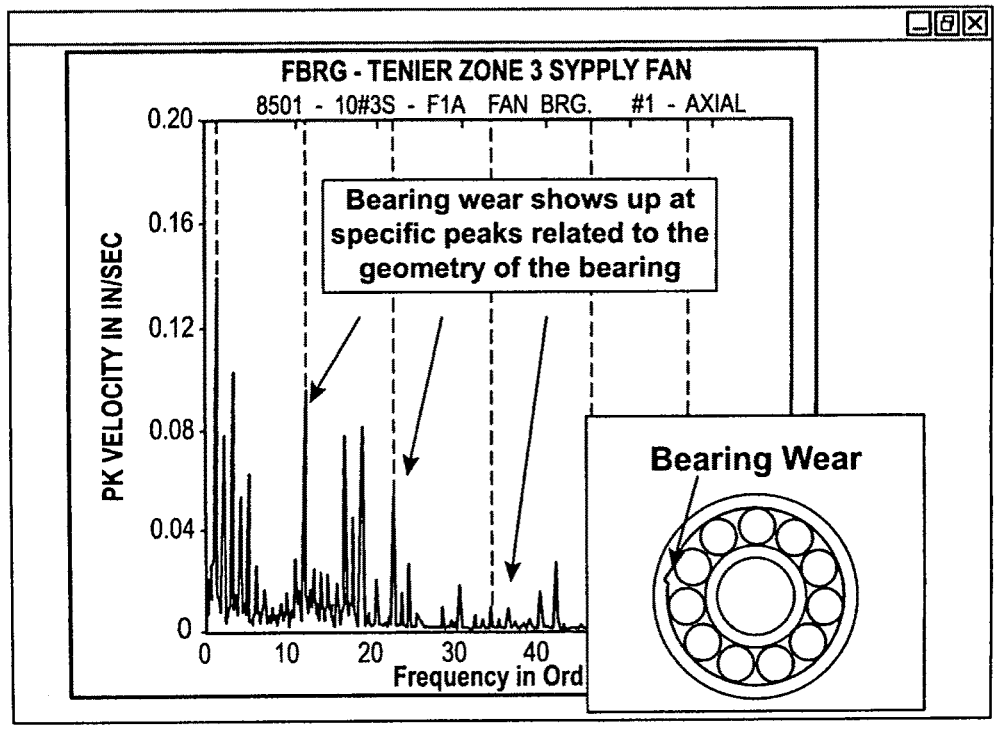

Referring now to FIGS. 6-9, the GUI can provide other screens to a user to indicate current or future problems, such as predicted problems, which can be detected by the asset management system 50 or any of the data analysis tools within the plant 10. In particular, FIGS. 6-9 illustrate displays showing spectral plots of vibration of an element, such as a shaft, within a rotary device performed by the vibration analysis programs 23 of FIG. 1 and conditions or problems detected by the analysis tool based on these plots. For example, FIG. 6 illustrates a detected imbalance condition, FIG. 7 illustrates a detected misalignment condition, FIG. 8 illustrates a detected looseness condition and FIG. 9 illustrates a detected worn bearing condition. Of course other conditions for rotary or other devices based on the results of data analysis tools can also be displayed. Still further, the results of these tools can be used to cause the maintenance order generation routine 54 to automatically order replacement parts.

Beyond graphically displaying various asset data, the control system may use the collected or derived status information to monitor plant assets, identify alarm conditions that require maintenance, estimate the time and cost for performing such maintenance, and prioritize and schedule maintenance orders based on such estimates.

Figure 10:
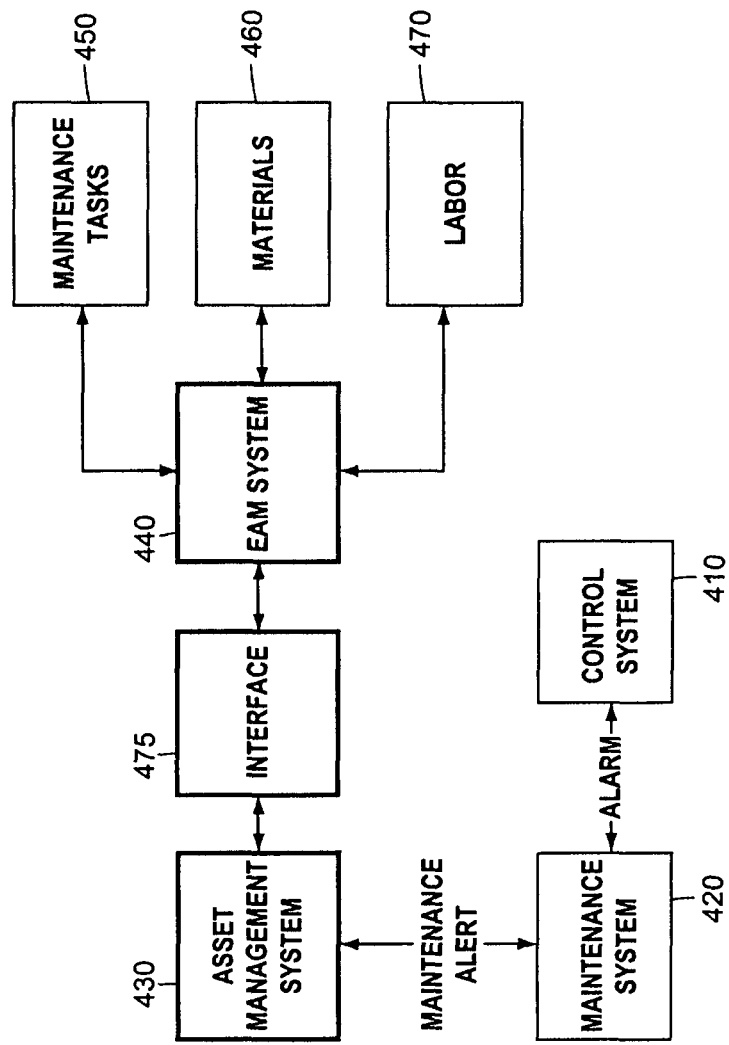
FIG. 10 is a data and information flow diagram with respect to an automatic maintenance estimation system within the plant of FIG. 1.

FIG. 10 illustrates an example maintenance scheduler system 400 in accordance with a present embodiment and that may be used in identifying and scheduling a maintenance order based on certain determined estimated maintenance information. In the illustrated example, the system 400 includes a control system 410, such as the control systems 12 and 14 described above, that communicates with assets, such as smart field devices, to determine if an alarm condition occurs at one of the assets. The control system 410 additionally or independently may communicate with an asset management system to determine an alarm condition based on model parameters, such as a performance, health, utilization, or variability index developed by the asset utilization expert. These indices may be used to automatically develop a maintenance order (see, e.g., FIGS. 5A and 5B) for the corresponding unit, device, field equipment, loop, etc., when the indices indicate that an asset is performing below a desired level. Ordinarily, the control system 410 will be connected to multiple assets through a controller, as described above.

In some examples, the control system 410 continuously monitors assets, while in some other examples the control system 410 monitors assets periodically, at scheduled times or in response to instructions, such as from a process system or business system. The communicated alarm condition may of course be based on a single index or event, while in other examples the alarm condition may be based on multiple indexes or events and based on a single asset or multiple assets. Further still, the control system 410 may develop an alarm condition based on a composite index that represents a combination of the various indexes modeled and developed by an asset utilization expert. For example, the control system 410 may be instructed to combine the performance and health indexes of an asset into a composite index that is used to create an alarm condition. Although, the alarm may be based on any other known metric.

When an alarm condition is identified, the control system 410 communicates the identity of the asset and the alarm information condition to a maintenance system 420, such as a maintenance system as described above. In other examples, the control system 410 may communicate status information on assets even when there is no alarm condition, as may be desired in the event that the maintenance system 420 provides predictive maintenance applications capable of predicting maintenance orders before an actual alert occurs. The maintenance system 420 may communicate the alarm condition from the control system 410, or the predictive alarm notification developed at the system 420, to users for display via user interface routines. Furthermore, the maintenance system 420 may notify maintenance personnel of the alarm condition, for example, in the event the alarm condition in an urgent event that requires immediate maintenance attention. Toward that end, the maintenance system 420 may be a computer executing an AMS™ application or any other device monitoring and communication applications. The maintenance system 420 may, in some instances, reconfigure or perform other maintenance activities on assets connected thereto. The maintenance system 429 may not only alert maintenance people to problems immediately, but also take corrective measures such as ordering parts, etc. which will be needed to correct a problem. In the illustrated example however, instead of immediately seeking to have a maintenance order created and scheduled in response to the alarm, the maintenance system 420 communicates a maintenance alert to an asset management system 430 that facilitates maintenance scheduling and maintenance order generation.

Upon receipt of the maintenance alert, the asset management system 430 retrieves data identifying the assert associated with the maintenance alert, and the asset management system 430 communicates that asset to an enterprise asset management system 440 which collects and stores historical data on maintenance orders, specifically maintenance items like labor, materials and tasks associated with the various maintenance orders. The enterprise asset management system 440 may be a system such as MAXIMO® of IBM of Armonk, N.Y., Datastream of Infor Global Solutions of Alpharetta Georgia, and the Plant Maintenance System of SAP AG of Walidorf, Germany. The enterprise asset management system 440 is not limited to these examples and may be implemented by other systems.

For each asset, the enterprise asset management system 440 identifies maintenance items associated with the asset and the maintenance alert. Specifically, the system 440 may retrieve stored maintenance task, material, and labor information from corresponding systems 450, 460, and 470, any of which may be part of a single system although they are shown separately. The system 450, for example, may contain data collected from the maintenance system 420, or another maintenance system, and listing the tasks required to complete a maintenance order associated with the identified asset. The system 460 contains a listing of the materials required to complete the maintenance tasks, and the system 470 contains a listing of the labor required for performing the identified maintenance tasks.

The systems 450-470 may store actual data on maintenance items, in the form of historical data compiled from past, completed maintenance orders performed on the same or similar asset devices. Because the data has been compiled from actual maintenance orders, the data may be considered actual data, in comparison to estimated or projected data. The systems 450-470 may store default data, not compiled from past experience, at least not from the asset's particular usage in the process. Such default data may have been developed for each asset and stored in the respective system during installation. The data stored in systems 450-470 may be developed at the plant or process level, or the data may be pushed to these systems from smart devices, for example, during device initialization. This data may include historical data collected from prior maintenance work performed on the asset or on similar assets. This historical data may include data reflective of past maintenance work recorded on a per unit, per area, per processor, per loop, or other bases as well. The historical data may include any data related to past maintenance orders and that may be informative to the asset management system 430.

In any event, the enterprise asset management system 440 communicates the tasks, materials, and labor data (i.e., the maintenance items) from systems 450-470, respectively, to the asset management system 430 for estimating the cost and time for completing a maintenance order associated with the alarm condition, and for creating the maintenance order request. The asset management system 430 may automatically determine estimated maintenance information in the form of an estimated cost, estimated time, and estimated materials required based on the data received from the enterprise asset management system 440.

In the illustrated example, the asset management system 430 is connected to the enterprise asset management system 440 through a plant interface 475, which may also interface with other systems such as the maintenance system 420, the control system 410, or a business system. The interface 475 may be a wired network interface coupled to an external bus. It will be appreciated that the interface 475 may be an Internet interface, a telephone link, wireless communication link, or other network interface through which systems may receive and transmit data. Furthermore, although in the illustrated example, the asset management system 430 is separate from the enterprise asset management system 440, in some examples both may be achieved through a single computer system, such as the computer system 30 of FIG. 1.

The asset management system 430 identifies the estimated maintenance information and generates a maintenance order request (like that of FIGS. 5A and 5B) containing the estimated maintenance information, which is then communicated back to the enterprise asset management system 440 for scheduling the maintenance order. It will be appreciated that in other examples, the asset management system 430 merely provides the estimated maintenance information, asset data, and maintenance alert to another system (including an enterprise asset management system) which may then automatically generate a maintenance order.

Figure 11:
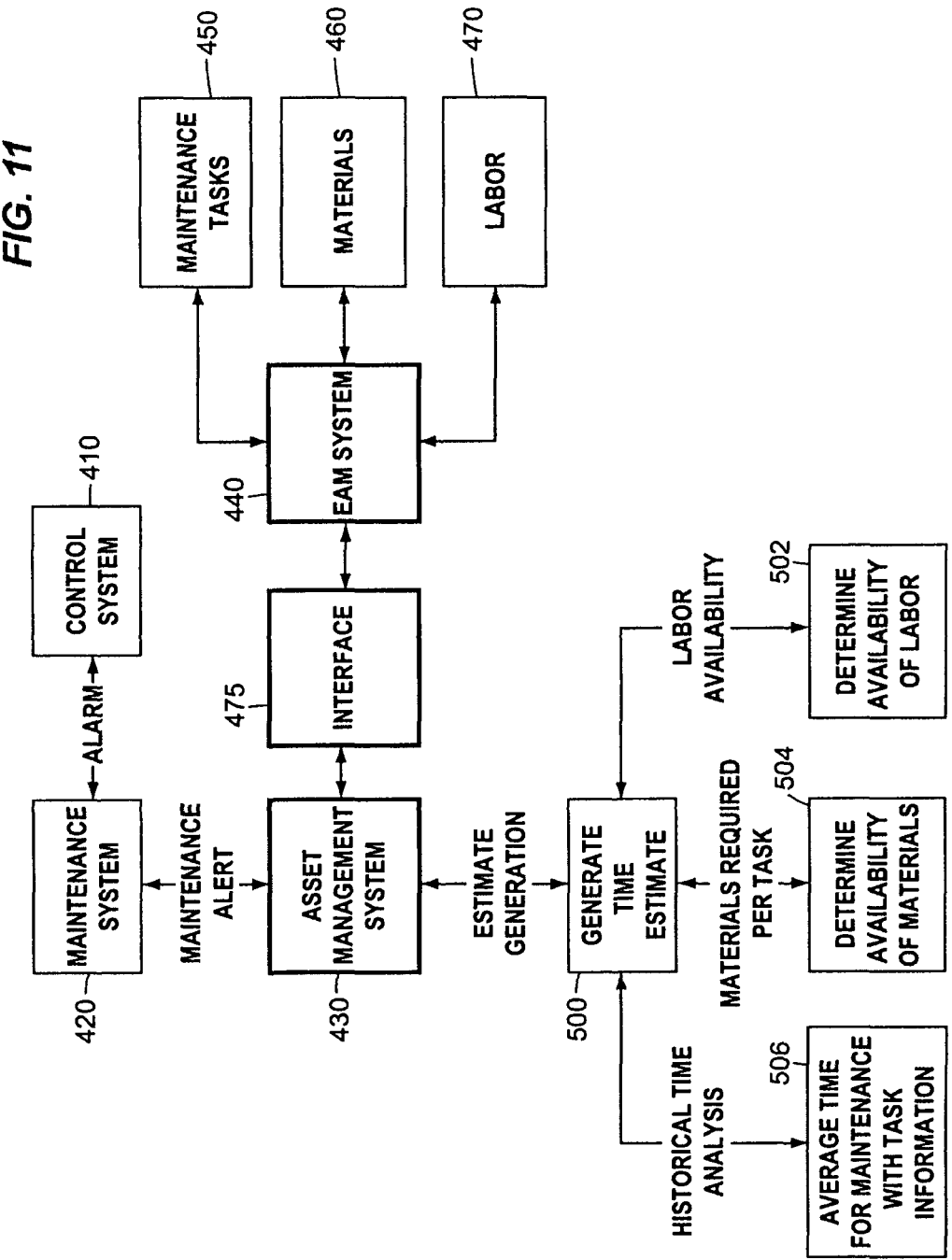
FIG. 11 is a data and information flow diagram of a further example of that of FIG. 10.
Figure 12:
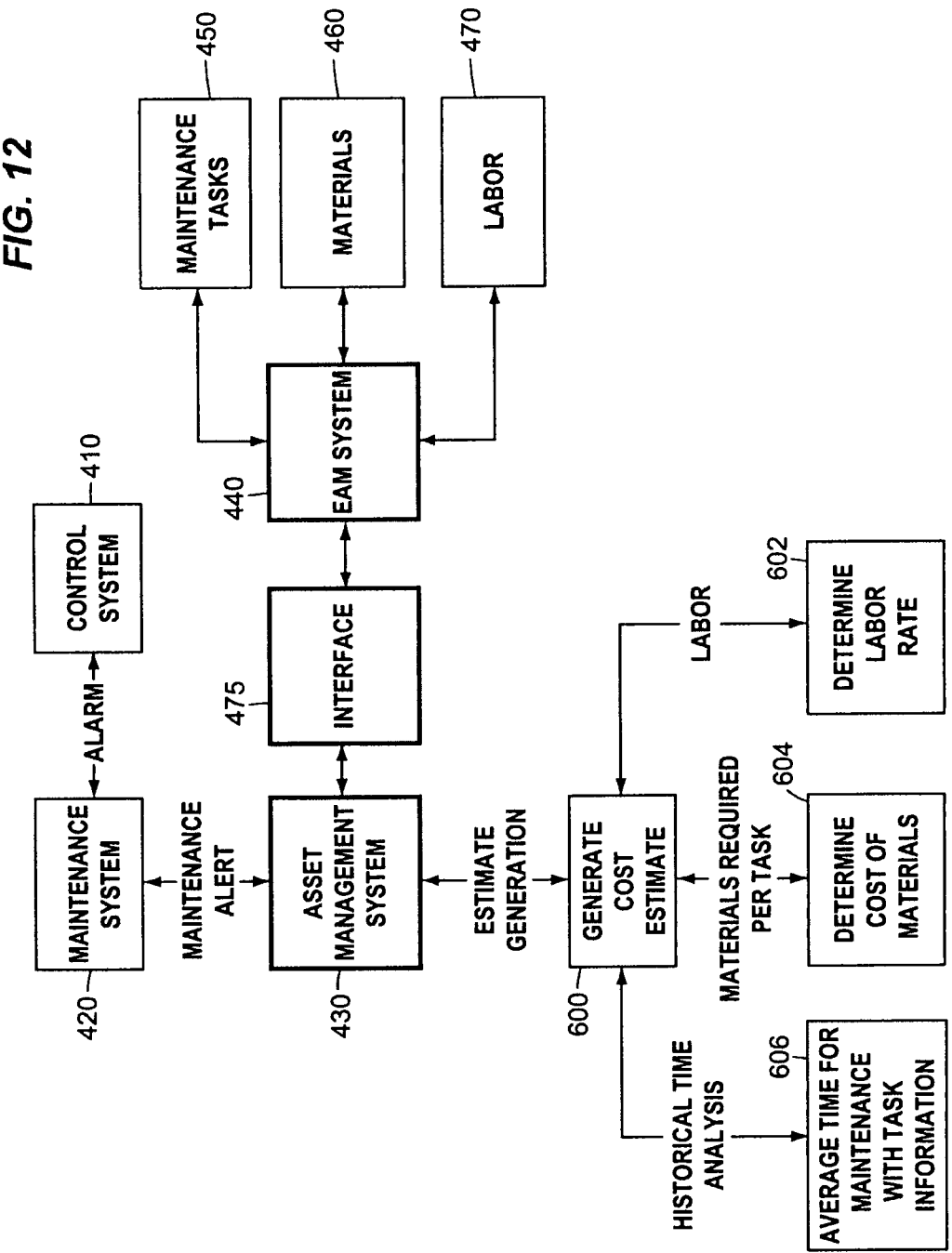
FIG. 12 is a data and information flow diagram of a further example of that of FIG. 10.

FIGS. 11 and 12 illustrate further data flow diagrams showing time and cost estimate generation as would be performed through the asset management system 430, respectively. FIG. 11 illustrates a time estimate generator 500 that may be part of the asset management system 430, although in the illustrated example is shown as separate thereto. The time estimate generator 500 communicates with a labor system 502 capable of determining the availability of the labor information obtained from system 470. The time estimate generator 500 communicates with a materials system 504 capable of determining the availability of the materials identified from system 460. The time estimate generator 500 further communicates with time averaging system 506 capable of determining an average time for completing a maintenance item of the maintenance order, as well as average time values associated with the overall maintenance order.

In general, the time estimate generator 500 may determine estimated time data reflecting the total amount of time from start to finish for a maintenance order to be completed. This total time estimate may be a combination of an estimated lead time, e.g., measured from the initiation of the maintenance alert to the projected start time of the maintenance order, and an estimated completion time. The systems 502, 504, and 506 may each produce an estimated time for the particular information being analyzed. The time estimator system 500 may then select the longest times from the collected data as the estimated time.

For example, the system 502 may determine if labor is available or not or if there is lead time required to approve and assign tasks, lead time that will be built into the estimate data. Such information may be determined by interfacing the asset management system 430 with business and maintenance systems.

The system 502 may also collect labor information from other maintenance orders scheduled by the enterprise asset management system 440 to determine if there are possible future labor conflicts that must be considered in estimating labor availability. For example, for certain assets identified to the enterprise asset management system 440, the system 470 may indicated that particular personnel are required to be on a maintenance crew. If the personnel are scheduled for other work in the plant over a time period, then the system 502 would identify that time period and adjust the labor availability accordingly, and the estimator 500 would adjust the time estimate accordingly. In any event, the longest lead time for all the labor information may then be fed back to the estimate generator 500.

The system 502 would perform similar functions to determine the projected completion time.

The system 504 may determine if lead time is required to obtain any of the materials identified from the system 460, which may be part of a business system. For example, the system 504 may assess the information received from the enterprise asset management system 440 and determine plant storage and/or supplier availability. In some examples, the system 504 may be in communication with the enterprise asset management system 440 to determine if other maintenance orders already scheduled in a maintenance schedule may deplete the materials needed for completing the currently analyzed maintenance order. The system 504 would communicate the longest lead time for a material to the estimator 500.

The system 506 may determine the average time associated with completing each of maintenance tasks identified by the system 450. This information may be entirely historical, developed from the enterprise asset management system 440 collecting actual start times and completion times from completed maintenance orders. This historical data may be based on maintenance orders formed of the same maintenance items or from maintenance orders with different, but still sufficiently similar maintenance items to warrant comparison.

The system 506 may take into account this historical data in determining an average time for completion of each of the identified maintenance tasks. The system 506 may also use non historical data, such as default start and completion times for the maintenance items. In cases where both historical and non-historical time data exist, the system 506 may determine average completion time and average start time by comparing estimated values against past historical actual values.

The particular lead time and completion time estimated for a maintenance order by the estimator 500 may be the longest lead time and completion time obtained from the systems 502, 504, or 506, respectively.

FIG. 12 shows an estimator 600 that may determines a cost estimate for the maintenance order, where that estimate may be a financial cost that includes the cost of parts and labor for performing maintenance on a particular unit. In some examples, the cost may include a transactional type cost that includes the cost attributed to the downtime associated with performing maintenance on asset. This type of estimate may be beneficial in instances where delays in the completion of certain maintenance orders may result in higher costs (increasing lost sales), as compared to delays experienced during execution of other maintenance orders. A system 602 determines a labor rate cost; a system 604 determines a materials cost; and a system 604 determines an average cost associated with each of the maintenance tasks. Each of these systems 602-606 may determine cost based in whole or in part upon pre-set cost information set for each of the labor, materials or tasks. However, additionally the estimated cost information from these systems may actual data stored as historical data and representing the actual costs of previous maintenance orders.

Merely by way of example, the materials, labor, and task data assessed through the estimators 500 and 600 may include data such as parts listings, required maintenance equipment, personnel specific items such as protective gear, instruction manuals, compliance authorizations, safety plan details.

The estimator 500 and estimator 600 generate time and cost estimate data for each maintenance order, respectively, and provides that information as estimated maintenance information to the asset management system 430, which then populates that information into a maintenance order, such as the maintenance order of FIGS. 5A and 5B. The asset management system 430 communicates the maintenance order with estimated maintenance information to the enterprise asset management system 440, which as discussed above acts as a maintenance scheduler in the illustrated example.

The enterprise asset management system 440 may schedule the maintenance order in any number of ways and based on any of the estimated or non-estimated data associated with the received maintenance order. In some examples, the system 440 may apply a multi-variable model (including higher order models such as $2^{nd}$, $3^{rd}$, and $4^{th}$ order differential models) to analyze the estimation data as well as other status information such as health index, performance index, variability index, and usability index to develop a maintenance schedule. The status data may be communicated from the asset management system 430 (like the system 50) connected to the network interface 475.

As a scheduler, the EAM 440 may prioritize all pending maintenance orders and the newly estimated maintenance order for storage in a storage medium and in a database form. As such, the EAM 440 may update the stored maintenance schedule upon receipt of each new estimated maintenance order, re-prioritizing the maintenance schedule as needed based on the estimation data for the new maintenance order.

As the schedule is created, or updated, the EAM 440 may queue the maintenance orders for execution at times identified by the schedule during creation and updating. As each maintenance order is due up for execution, or advantageously prior to each maintenance order start time and with sufficient time to allow for delivery and receipt, the EAM 440 may communicate the required parts lists, orders and any other pertinent information to a vendor computer system for automatic parts ordering, through known techniques. In other examples, the EAM 440 may instruct a business system computer to complete parts ordering, as the maintenance order start time approaches.

Figure 13:
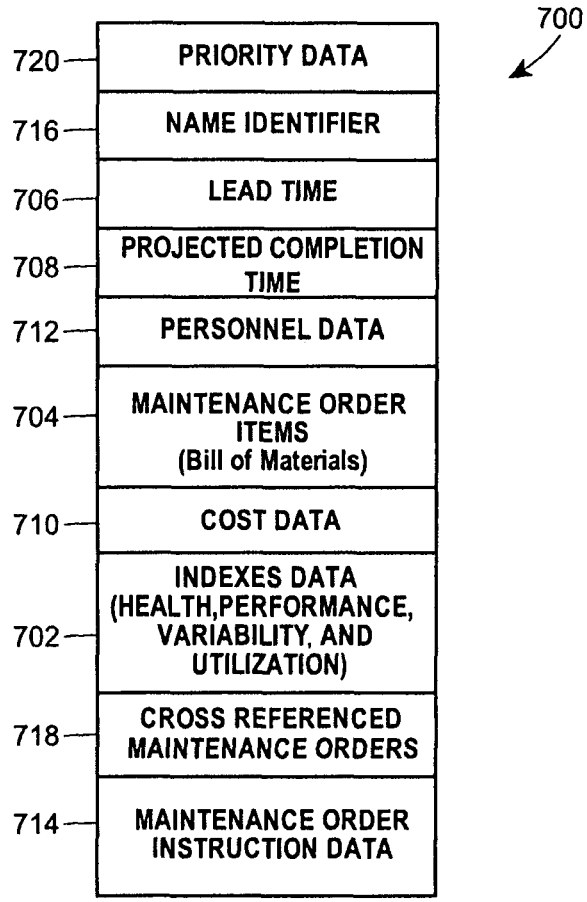
FIG. 13 is a diagram of an example data information element for a maintenance order, showing various data determined by the maintenance estimation system of FIG. 10.

FIG. 13 shows an example data element for a maintenance order 700 and that may be stored by the asset management system 430 as maintenance order data for the EAM 440 to use in scheduling. In the illustrated example, the maintenance order data 700 is separated into fields, one for each of the different data elements provided by the system. Indexes such as those described above and identified at the asset management system 430 are stored in a storage region 702. The asset management system 430 may store the maintenance items forming the maintenance order in a storage region 704, such maintenance items being identified from system 460, for example. The asset management system 430 may store the estimated lead time data at a storage region 706, the estimated completion time data at a storage region 708, and the estimated cost data at a storage region 710. Each of the estimated time values may be linked to each of the stored maintenance items, for example, in a relational form, table, etc. The asset management system 430 stores personnel data such as necessary maintenance team size may be received from the systems 470 and 450, respectively, at storage region 712. General information regarding the maintenance order, such as specific instructions for executing the maintenance order, is stored at a storage region 714. FIG. 13 illustrates an example of the data that may be stored for a particular maintenance order, additional, fewer, or different data may be stored as needed for order execution and scheduling.

Because, as explained in further detail below, changes to certain maintenance orders may alter the estimated times and costs associated with other scheduled maintenance orders, a section of the data information element 700 is reserved for cross references to other maintenance orders, each of which may be identified by a fixed maintenance order identifier name, stored at region 716. The cross reference data at region 718 lists other maintenance orders that have been previously identified by the asset management system 430 or enterprise asset management system 440 as having an item that depends upon an associated item for the maintenance order 700. For example, the items stored in region 704 may include items that are to be used in subsequent maintenance orders, so long as the items are in operating condition. In some examples, the cross-reference data along with any of the other non-estimated maintenance information may be stored by the EAM 440 in response to the initial asset management system 430 identification of the asset corresponding to the maintenance alert. In other examples the information element 700 may be created after the maintenance order has been generated by the asset management system 430.

Cross-referencing may be achieved automatically. The cross reference may also include maintenance order items that have been manually identified by process, business, or maintenance personnel. For example, process personnel may recognize that multiple maintenance orders on a particular unit, although not necessarily relying upon the same equipment or personnel, should be executed together to minimize down time of the unit. In such situations, although the EAM 440 acting as a scheduler could have been programmed to schedule maintenance orders for the same unit for immediate sequential operation, the cross reference region 718 would serve as a further layer of protection against the EAM 440 re-ordering maintenance orders in non-ideal ways, merely because a changed circumstance arises during execution of one maintenance order. It may be determined, for example, that the optimum execution of a maintenance schedule may involve delaying the entire schedule in response to a delay in the execution of a particular maintenance event, instead of re-scheduling maintenance orders to avoid downtime completely. By storing cross-reference information, different maintenance orders may be linked together for contiguous execution.

In any event, after developing a schedule for the maintenance orders, the EAM 440 then places an order identifier in a priority data region 720.

Figure 14:
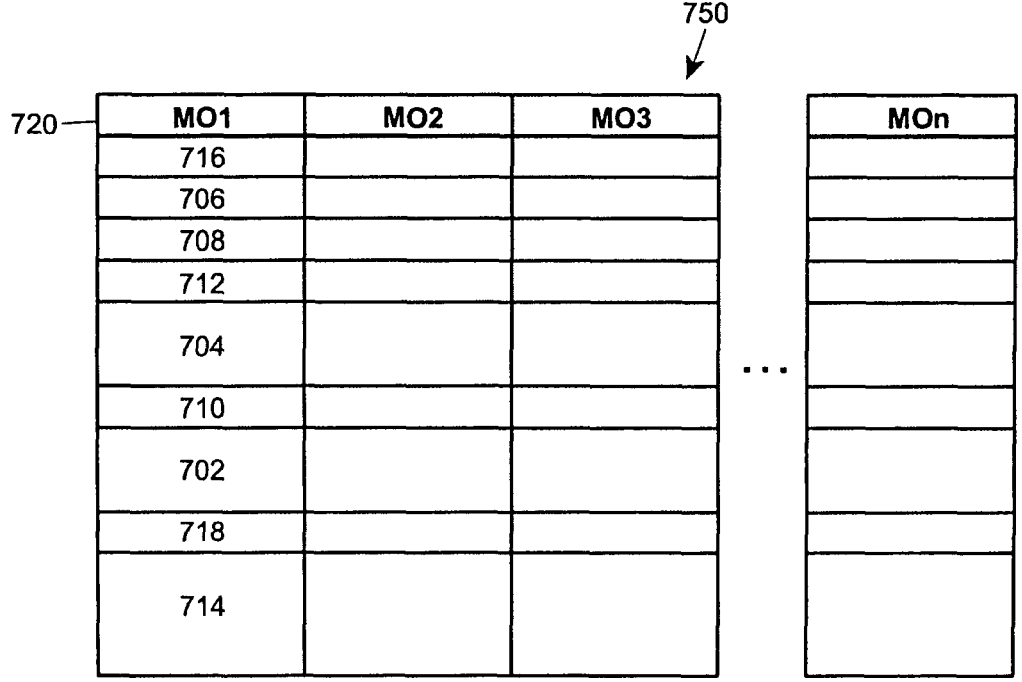
FIG. 14 is a diagram of a maintenance order schedule stored in a table format, and showing multiple maintenance orders.

FIG. 14 illustrates an example maintenance schedule data table 750. The data table illustrates a plurality of maintenance orders, labeled MO1, MO2, MO3 for convenience sake, and stored in scheduled order of execution. As each is executed the data field may be left shifted, in the illustrated example, where the fields of entry MO2 are moved to entry MO1, etc. upon maintenance order completion. Each maintenance order includes the data fields associated with those discussed above with respect to FIG. 13, and thus like reference numerals are used. The data table 750 includes an identification row of the priority data stored at 720, and indicating the order in which maintenance orders are to be executed.

Figure 15:
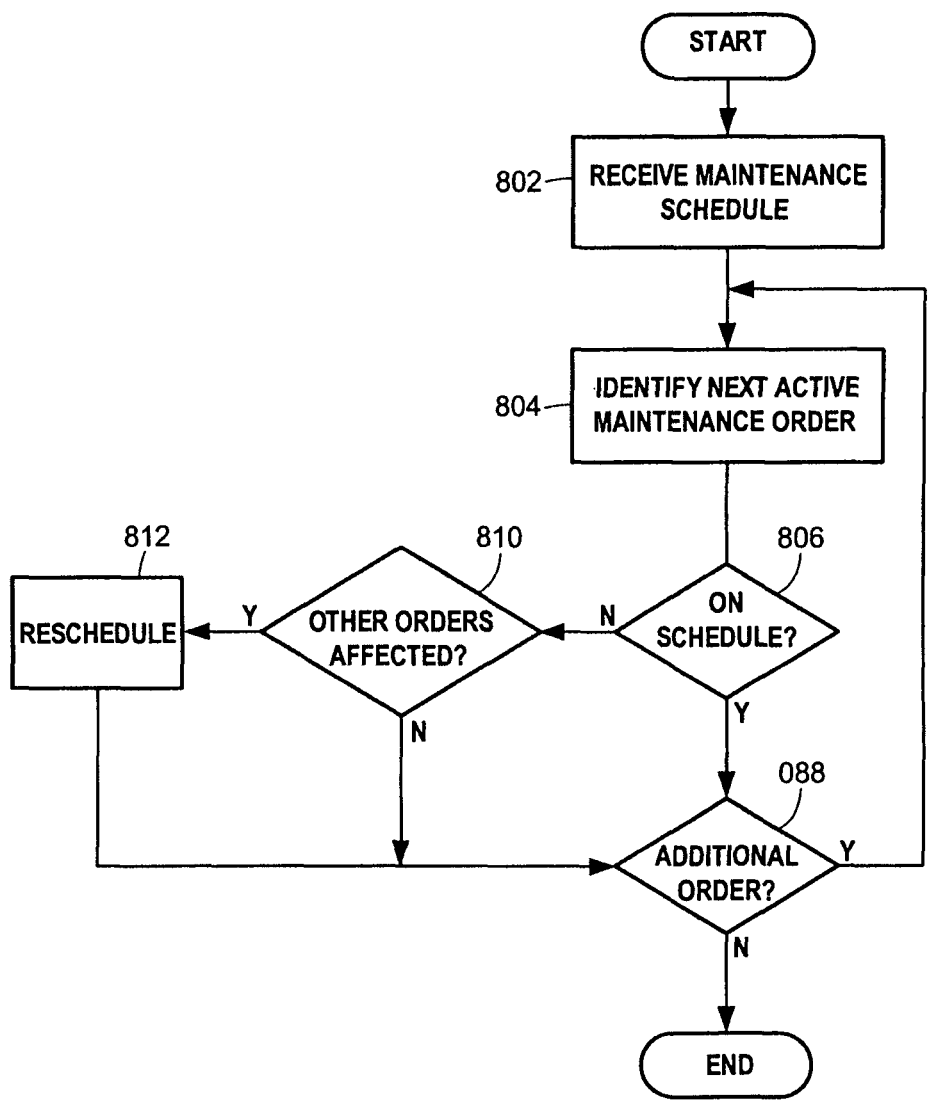
FIG. 15 is a flow diagram of an example process for re-organizing a maintenance schedule in response to changes in the status of an active maintenance order, alarm, or other event.

As discussed above, the EAM 440 may update the stored maintenance schedule in real time in response to changes that occur during execution of a maintenance order. For example, if maintenance personnel encounter a problem during execution of a maintenance order, such as equipment failure, alarm requests for newly identified maintenance orders, unexpected availability issues, then the EAM 440 may be programmed to re-schedule the queued maintenance orders in light of the changed circumstances. FIG. 15 illustrates an example process that may be executed by the EAM 440 in response to such circumstances. A block 802 receives the current maintenance schedule. A block 804 then identifies an active maintenance order, which may be any currently executed maintenance order or any of the queued maintenance orders awaiting execution. The block 806 polls a user for maintenance status information, for example through a GUI, and in response determines whether the active maintenance order is on schedule or not. The block 806 may poll business and maintenance systems, for example.

If maintenance order completion is on schedule with the estimated time, then a block 808 determines if additional active maintenance orders exist in which case control is returned to block 804.

If the order is not on schedule, then a block 810 determines if the delay will affect other maintenance orders stored in the schedule. The block 810, for example, may determine a new projected completion time and determine if that completion time conflicts with the projected start times of other maintenance orders, for example, those maintenance orders that will require the same maintenance personnel or the same maintenance equipment as currently being used by the delayed maintenance order. If a potential conflicts exist, then control is passed to a block 812 for re-scheduling the maintenance schedule. The block 812 may be programmed to automatically reschedule the maintenance orders or provide personnel with a GUI indication of the potential conflict and the need for rescheduling so that personnel can adjust the maintenance schedule manually. The block 812 for example may notify personnel through the user interface routines 58 of FIG. 2. In such cases, the block 812 may wait for instruction from personnel before proceeding to block 808. In some examples, the block 812 may be executed entirely within an enterprise asset management system. In some examples, the block 812 may include passing control, at least temporarily, to an asset management system for re-estimating estimated maintenance information for a maintenance item and in response to the changed circumstances. If after re-scheduling the maintenance schedule, the block 808 determines that no additional maintenance orders exist, the process ends.

Figure 16:
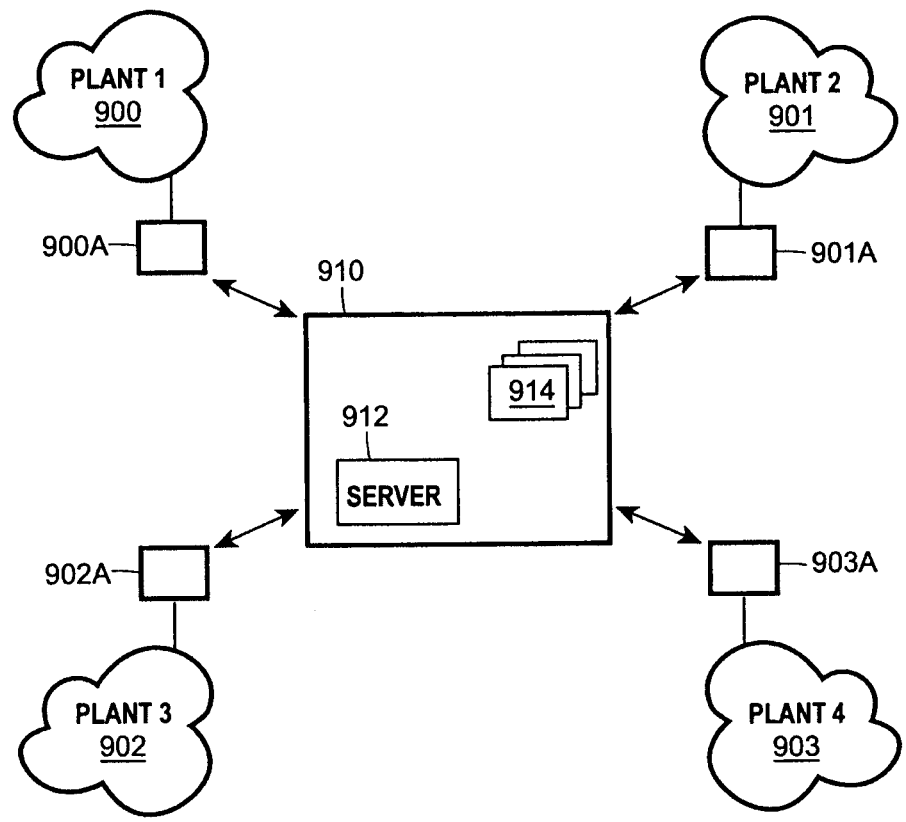
FIG. 16 is a block diagram of a remote monitoring facility connected to multiple process plants via a communication network.

Referring now to FIG. 16, a method of remotely providing access to a maintenance scheduler, maintenance item estimator and other data analysis tools will be described. As illustrated in FIG. 16, one or more process plants 900, 901, 902 and 903 operate independently. Each of the plants 900-903 periodically collects data pertaining to the plant, including maintenance orders, estimated and actual maintenance information, and maintenance schedules and then sends that data to a data processing facility or remote monitoring facility 910. To accomplish this function, each of the plants 900-903 has a user interface or server 900A-903A and these servers are connected via any desired communication network, such as the Internet or the worldwide web, to the remote monitoring facility 910.

The remote monitoring facility 910 may include a web server 912 through which the processes 900-903 communicate with the remote monitoring facility 910. Each plant may execute processes as described in reference to FIGS. 1-15 above. For processes like that of system 400, each plant may not only communicate with systems internal to the plant but may obtain maintenance order information from other plants via the monitoring facility 910. For example, the plant 902 may obtain historical data on maintenance items from plants 900, 901, and 903 by communicating with the remote monitoring facility 910. This may be particularly useful where a particular plant may not have historical data for maintenance items identified for a particular maintenance order. To facilitate communication, the remote monitoring facility 910 may also include one or more processors 914 having associated databases that store plant data. The processors 914 may have access to and execute data monitoring tools, including, for example, any of the applications or tools within any of the computer systems of FIG. 1, such as any of the process control tools, process monitoring tools, equipment or device monitoring tools, index generation tools, maintenance order generation tools, business or other tools or applications described herein. In one example, the process monitoring tool described in U.S. patent application Ser. Nos. 09/256,585 and 09/499,445 may be used to monitor process parameters.

While the system 400 and other process elements have been described as preferably being implemented in software, they may be implemented in hardware, firmware, etc., and may be implemented by any other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium). Also, while the system 400 is described as possibly being a rule-based expert, other types of expert engines could be used as well, including those which use other known data mining techniques.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What we claim is:

1. A method of automatically scheduling maintenance orders within a process plant comprising a plurality of assets, the method comprising:

generating, in a maintenance planning computer, a maintenance order in response to a maintenance alert for one of the plurality of assets;

generating, in the maintenance planning computer, estimated maintenance information for the maintenance order, the estimated maintenance information indicating an estimated time or an estimated cost associated with the maintenance order, where the estimated time or the estimated cost varies depending upon maintenance information for at least one other maintenance order corresponding to a different asset, the estimated maintenance information being stored as a data table accessible by the maintenance planning computer, the data table including a field for cross-referenced maintenance orders;

receiving data from at least one asset, executing models from among a plurality of computer-implementable models stored at the maintenance planning computer, and generating for the at least one asset, a health index, a performance index, a usability index, or a variability index, from the received data and based on one or more of the plurality of computer-implementable models;

scheduling, in the maintenance planning computer, the maintenance order using a multi-variable model from among the executed models, the multi-variable model being based on the generated health index, performance index, usability index, or variability index, where the maintenance order is scheduled among one or more other maintenance orders, the scheduling resulting in a maintenance schedule that includes the maintenance order; and in response to detection of a delay in an active maintenance order, determining if that delay affects the scheduling of the maintenance order of any of the one or more other maintenance orders, and, if so, re-scheduling the affected maintenance order and any of the affected one or more other maintenance orders, wherein determining if that delays affects the scheduling includes determining if there are any cross-referenced maintenance orders stored in the data table, and wherein re-schedule includes determining whether to re-order the affected maintenance order and determining whether to instead delay the affected maintenance order and the cross-referenced maintenance orders, wherein generating the maintenance order in response to the alert further comprises (i) collecting historical data of at least one previous maintenance order corresponding to the maintenance alert; (ii) determining the estimated maintenance information based, in part, on the historical data compiled from past maintenance orders; and (iii) if no historical data is available then obtaining other historical data compiled from past maintenance orders on a comparable asset via a remote monitoring facility and through a communication network, wherein the maintenance planning computer is configured to receive the data in response to the executed models and wherein at least some of the received data is formatted in a descriptive language, the method further comprising the maintenance planning computer mapping the received data in the descriptive language from one schema to another schema in accordance with the executed models.

2. The method of claim 1, further comprising generating an estimated completion time as the estimated time for the maintenance order, the estimated maintenance information containing the estimated completion time.

3. The method of claim 1, further comprising generating an estimated start time as the estimated time for the maintenance order, the estimated maintenance information containing the estimated start time.

4. The method of claim 1, further comprising generating the estimated cost for the maintenance order, the estimation maintenance information containing the estimated cost.

5. The method of claim 1, wherein the maintenance order is given a higher priority or a lower priority over at least one of the plurality of other maintenance orders based on the estimated maintenance information.

6. The method of claim 1, wherein the historical data comprises maintenance task information, labor information, or materials information for the at least one previous maintenance order.

7. The method of claim 1, wherein the historical data comprises an average completion time for the at least one previous maintenance order.

8. The method of claim 1, wherein the historical data comprises an average cost for the at least one previous maintenance order.

9. The method of claim 1, wherein the at least one previous maintenance order was completed in response to the maintenance alert for at least one other of the plurality of assets.

10. The method of claim 1, further comprising after completion of the maintenance order, modifying the historical data with actual maintenance task, actual labor, and actual materials information for the maintenance order.

11. The method of claim 1, further comprising communicating the maintenance schedule to maintenance personnel.

12. The method of claim 1, further comprising modifying the maintenance schedule in response to a change in the estimated maintenance information.

13. The method of claim 1, wherein receiving data comprises receiving data pertaining to the status of one of a two-wire device, a three-wire device, a four-wire device, a wireless device, a device having a processor, a variable speed driver, a controller, a multiplexer, rotating equipment, an actuator, power generation equipment, power distribution equipment, a transmitter, a sensor, a control system, a transceiver, a valve, a positioner, a switch, electrical equipment, a server, a hand held device, a pump, an I/O system, a smart field device, a non-smart field device, a highway addressable remote transducer protocol compliant protocol device, an International Electrotechnical Commission 61158 compliant protocol device, a process field bus compliant protocol device actuator sensor interface compliant protocol device, a controller-area network compliant protocol device, a TCP/IP protocol device, an Ethernet device, an internet-based device, and a network communication device.

14. A method of automatically scheduling maintenance orders within a process plant, the method comprising:

generating, in the maintenance planning computer, a maintenance order in response to a maintenance alert for an asset in the process plant, the maintenance order comprising maintenance items for completing the maintenance order;

receiving, in the maintenance planning computer, actual data on the maintenance items, wherein the actual data on the maintenance items is historical data collected from maintenance items of a completed maintenance order;

receiving, in the maintenance planning computer, estimated maintenance information on the maintenance items, where the estimated maintenance information varies depending upon maintenance information from at least one other maintenance order corresponding to a different asset, the estimated maintenance information being stored as a data table accessible by the maintenance planning computer, the data table including a field for cross-referenced maintenance orders;

comparing, in the maintenance planning computer, the actual data and the estimated maintenance information to generate estimated maintenance information for the maintenance order, the estimated maintenance information indicating an estimated time or an estimated cost associated with the maintenance order;

executing models from a plurality of computer-implementable models stored at the maintenance planning computer;

receiving data from the asset and generating, in real time, a health index, a performance index, a usability index, or a variability index, from the received data and based on one or more of the executed models;

generating, in the maintenance planning computer, a maintenance schedule including the maintenance order using a multi-variable model from among the executed models, the multi-variable model being based on the generated health index, performance index, usability index, or variability index;

in response to detection of a delay in an active maintenance order, determining if that delay affects the maintenance schedule, and, if so, revising the estimated maintenance information and generating a revised maintenance schedule, wherein determining if that delays affects the maintenance schedule includes determining if the active maintenance order has any cross-referenced maintenance orders stored in the data table, and wherein revising the estimated maintenance information includes determining whether to re-order the active maintenance order and determining whether to instead delay the active maintenance order and the cross-referenced maintenance orders;

collecting historical data of at least one previous maintenance order;

determining the estimated maintenance information based, at least in part, on the historical data; and obtaining, if no historical data is available, other historical data compiled from past maintenance orders on a comparable asset via a remote monitoring facility and through a communication network, wherein the maintenance planning computer is configured to receive the data in response to the executed models and wherein at least some of the received data is formatted in a descriptive language, the method further comprising the maintenance planning computer mapping the received data in the descriptive language from one schema to another schema in accordance with the executed models.

15. The method of claim 14, wherein the maintenance order is given a higher priority in the maintenance scheduling based on the estimated maintenance information.

16. The method of claim 14, wherein generating the maintenance schedule further comprises generating the maintenance schedule based current status information for the asset.

17. The method of claim 16, wherein the current status information is a health index, a performance index, a usability index, or a variability index.

18. The method of claim 14, further comprising receiving the historical data from an enterprise asset management system.

19. The method of claim 14, wherein the historical data comprises an average completion time for the completed maintenance order.

20. The method of claim 14, wherein the historical data comprises an average cost for the completed maintenance order.

21. The method of claim 14, wherein the actual data on the maintenance items comprises current maintenance task information, labor information, or materials information.

22. A system to be used in a process control environment for estimating a maintenance order, wherein the process control environment includes a plurality of devices, the system comprising:
- a computer readable memory;
- a first set of instructions stored on the computer readable memory and adapted to be executed on a processor to generate a maintenance order in response to a maintenance alert for one of the plurality of devices;
- a first additional set of instructions stored on the computer readable memory and adapted to be executed on a processor (1) to execute models from a plurality of computer-implementable models stored at the maintenance planning computer, (ii) to receive data from at least one device and (iii) to generate, in real time, for the at least one device, a health index, a performance index, a usability index, or a variability index, from the received data and based on one or more of the executed models;
- a second set of instructions stored on the computer readable memory and adapted to be executed on a processor to generate estimated maintenance information for the maintenance order, the estimated maintenance information indicating an estimated time or an estimated cost associated with the maintenance order, where the estimated maintenance information varies depending upon maintenance information from at least one other maintenance order corresponding to a different asset, the estimated maintenance information being stored as a data table accessible by the maintenance planning computer, the data table including a field for cross-referenced maintenance orders;
- a third set of instructions stored on the computer readable memory and adapted to be executed on a processor to communicate the maintenance order to a maintenance scheduler;
- a fourth set of instructions stored on the computer readable memory and adapted to be executed on a processor to develop a maintenance schedule prioritizing the maintenance order using a multi-variable model from among the executed models, the multi-variable model being based on the generated health index, performance index, usability index, or variability index;
- a fifth set of instructions stored on the computer readable memory and adapted to be executed on a processor to determine, in response to detection of a delay in an active maintenance order, if that delay affects the maintenance schedule, and, if so, revising the estimated maintenance information and generating a revised maintenance schedule, wherein instructions to determine if the delays affects the maintenance schedule include instructions to determine if there are any cross-referenced maintenance orders stored in the data table, and wherein the instructions to revise the estimated maintenance information include instructions to determining whether to re-order the active maintenance order and instructions to determine whether to instead delay the active maintenance order and the cross-referenced maintenance orders;
- a second additional set of instructions stored on the computer readable memory and adapted to be executed on a processor to collect historical data of at least one previous maintenance order;
- a third additional set of instructions stored on the computer readable memory and adapted to be executed on a processor to determine the estimated maintenance information based, at least in part, on the historical data;
- a fourth additional set of instructions stored on the computer readable memory and adapted to be executed on a processor to determine if no historical data is available and then to obtain other historical data compiled from past maintenance orders on a comparable asset via a remote monitoring facility and through a communication network; and
- a further set of instructions stored on the computer readable memory and adapted to be executed on a processor to receive the data in response to the executed models, wherein at least some of the received data is formatted in a descriptive language; and
- a another further set of instructions stored on the computer readable memory and adapted to be executed on a processor to map the received data in the descriptive language from one schema to another schema in accordance with the executed models.

23. The system of claim 22, further comprising:
- a sixth set of instructions stored on the computer readable memory and adapted to be executed on a processor to receive data identifying the status of the plurality of devices; and
- a seventh set of instructions stored on the computer readable memory and adapted to be executed on a processor to generate the maintenance alert in response to the received data identifying the status of the plurality of devices.

24. The system of claim 23, wherein the historical data comprises maintenance task information, labor information, or materials information for the at least one previous maintenance order.

25. The system of claim 23, wherein the historical data comprises an average completion time for the at least one previous maintenance order.

26. The system of claim 23, wherein the historical data comprises an average cost for the at least one previous maintenance order.

27. The system of claim 23, further comprising a third additional set of instructions stored on the computer readable memory and adapted to be executed on a processor to modify the historical data with actual maintenance task information, actual labor information, or actual materials information.

28. The system of claim 23 wherein the one of the plurality of devices having the maintenance order is a first type of plant asset and wherein the at least one previous maintenance order was executed on second type of plant asset different than the first type of plant asset.

29. The system of claim 22, further comprising a sixth set of instructions stored on the computer readable memory and adapted to be executed on a processor to develop the maintenance schedule by prioritizing the maintenance order by comparing the estimated maintenance information to other maintenance orders.

30. The system of claim 22, further comprising a sixth set of instructions stored on the computer readable memory and adapted to be executed on a processor to communicate the maintenance schedule to maintenance personnel.

31. The system of claim 22, further comprising a sixth set of instructions stored on the computer readable memory and adapted to be executed on a processor to generate an estimated completion time as the estimated time for the maintenance order.

32. The system of claim 22, further comprising a sixth set of instructions stored on the computer readable memory and adapted to be executed on a processor to generate an estimated start time as the estimated time for the maintenance order.

33. The system of claim 22, further comprising a sixth set of instructions stored on the computer readable memory and adapted to be executed on a processor to generate the estimated cost.

34. The system of claim 22, further comprising a sixth set of instructions stored on the computer readable memory and adapted to be executed on a processor to develop the maintenance schedule based on current asset data.

35. The system of claim 22, further comprising a sixth set of instructions stored on the computer readable memory and adapted to be executed on a processor to modify the maintenance schedule in response to a change in the estimated maintenance information.

\* \* \* \* \*